US012677252B2

(12) United States Patent
Xu et al.

(10) Patent No.: US 12,677,252 B2
(45) Date of Patent: Jul. 7, 2026

(54) REMOTE UE GROUP PAGING FOR RELAY POWER SAVING

(71) Applicant: QUALCOMM Incorporated, San Diego, CA (US)

(72) Inventors: Huilin Xu, Temecula, CA (US); Peng Cheng, Beijing (CN); Yuwei Ren, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 428 days.

(21) Appl. No.: 18/252,471

(22) PCT Filed: Jan. 18, 2021

(86) PCT No.: PCT/CN2021/072383
§ 371 (c)(1),
(2) Date: May 10, 2023

(87) PCT Pub. No.: WO2022/151461
PCT Pub. Date: Jul. 21, 2022

(65) Prior Publication Data
US 2024/0381309 A1      Nov. 14, 2024

(51) Int. Cl.
*H04W 68/02* (2009.01)
*H04W 88/04* (2009.01)
(52) U.S. Cl.
CPC ............ *H04W 68/02* (2013.01); *H04W 88/04* (2013.01)

(58) Field of Classification Search
CPC . H04W 68/02; H04W 88/04; H04W 52/0219; H04W 52/0216; H04W 8/005;
(Continued)

(56) References Cited

U.S. PATENT DOCUMENTS

2013/0016646 A1* 1/2013 Chang ................... H04W 76/14
370/312
2018/0352412 A1* 12/2018 Huang .............. H04W 36/0055
(Continued)

FOREIGN PATENT DOCUMENTS

CN      108307489 A      7/2018
CN      109314950 A      2/2019
(Continued)

OTHER PUBLICATIONS

International Search Report and Written Opinion—PCT/CN2021/072383—ISA/EPO—Oct. 15, 2021.
(Continued)

*Primary Examiner* — Nimesh Patel
(74) *Attorney, Agent, or Firm* — Harrity & Harrity, LLP

(57) ABSTRACT
Various aspects of the present disclosure generally relate to wireless communication. In some aspects, a user equipment (UE) may transmit, to a base station, information identifying multiple remote UEs for which the UE serves as a relay UE. The UE may receive, from the base station, an indication of a grouping of the remote UEs into one or more paging groups. The UE may monitor, for each paging group of the one or more paging groups, paging occasions associated with that paging group to determine whether paging messages for the remote UEs in that paging group are received from the base station. Numerous other aspects are described.

30 Claims, 14 Drawing Sheets

1100 ➔

1110 ⌇ Transmit information identifying multiple remote UEs for which the UE serves as a relay UE 1120 ⌇ Receive an indication of a grouping of the remote UEs into one or more paging groups 1130 ⌇ Monitor, for each paging group of the one or more paging groups, paging occasions associated with that paging group to determine whether paging messages for the remote UEs in that paging group are received from the base station

1200 ➔

1210 ⌇ Receive information identifying multiple remote UEs for which the UE serves as a relay UE 1220 ⌇ Transmit an indication of a grouping of the remote UEs into one or more paging groups

(58) Field of Classification Search

CPC ..... H04W 48/16; H04W 92/18; H04W 48/12; H04W 40/12; H04W 40/22; H04W 40/24; H04W 76/14; H04W 64/00; H04W 72/0446; H04W 72/23; H04W 72/1268; H04W 72/21; H04W 72/20; H04W 72/542; H04W 60/04; H04W 8/24; H04W 88/14; H04W 72/04; H04W 72/25; H04W 36/00698; H04W 36/0094; H04W 72/54; H04W 72/543; H04W 92/02; H04W 92/16; H04W 72/563; H04W 72/535; H04W 16/18; H04W 68/12; H04W 72/02; H04W 52/0229; H04W 52/0245; H04W 28/0268; H04W 28/0236; H04W 28/0967; H04W 48/10; H04W 84/042; H04W 4/023; H04W 36/302; H04W 56/002; H04W 76/10; H04W 36/18; H04W 36/00833; H04W 36/144; H04W 36/03; H04W 72/00; Y02D 30/70; G01S 1/042; G01S 1/0428; G01S 5/0072; G01S 5/0236; H04L 5/0051; H04L 5/0094; H04L 5/0053; H04L 5/0048; H04L 5/0023; H04L 5/0055; H04L 5/0007; H04L 5/0098; H04L 27/261; H04L 1/0026; H04L 41/0894; H04L 5/006; H04L 2001/0097; H04L 41/0803; H04L 43/08; H04L 5/0037; H04B 7/0695; H04B 7/088; H04B 7/0626; H04B 17/318; H04B 7/0617; H04B 17/336; H04B 17/345; H04B 17/328; H04B 7/0632; H04B 7/06954; H04B 7/24; H04B 7/15507; H04B 7/0452; H04B 17/327; H04B 17/382; H04B 17/346; H04B 17/3913; G06N 20/00; G06N 3/063; H04J 11/0056; H04J 11/0036; H04J 11/0053; H04J 11/005; H04J 13/004; H04J 11/0069; H04J 13/18; H04J 11/0079; H04J 11/0026; H04J 11/00; H04J 11/0059; H04J 11/0023; H04J 2011/0096

See application file for complete search history.

(56) References Cited

U.S. PATENT DOCUMENTS

| | | | |
|---|---|---|---|
| 2019/0230723 A1 | 7/2019 | Kim et al. | |
| 2019/0274121 A1* | 9/2019 | Wu | H04L 5/0092 |
| 2019/0373652 A1* | 12/2019 | Hong | H04W 76/14 |
| 2023/0413229 A1* | 12/2023 | Wang | H04W 4/06 |

FOREIGN PATENT DOCUMENTS

| | | | | |
|---|---|---|---|---|
| EP | 3499975 A1 * | 6/2019 | | H04W 52/0241 |
| GB | 2555662 A | 5/2018 | | |
| WO | 2018028279 A1 | 2/2018 | | |

OTHER PUBLICATIONS

Sequans Communications: "Power Efficient Relay Discovery Maintenance and Establishment", 3GPP Draft, 3GPP TSG-RAN WG2 Meeting #97, R2-1701648, Athens, Greece, Feb. 13-17, 2017, 9 Pages.

Supplementary European Search Report—EP21918663—Search Authority—The Hague—Sep. 16, 2024.

* cited by examiner

900

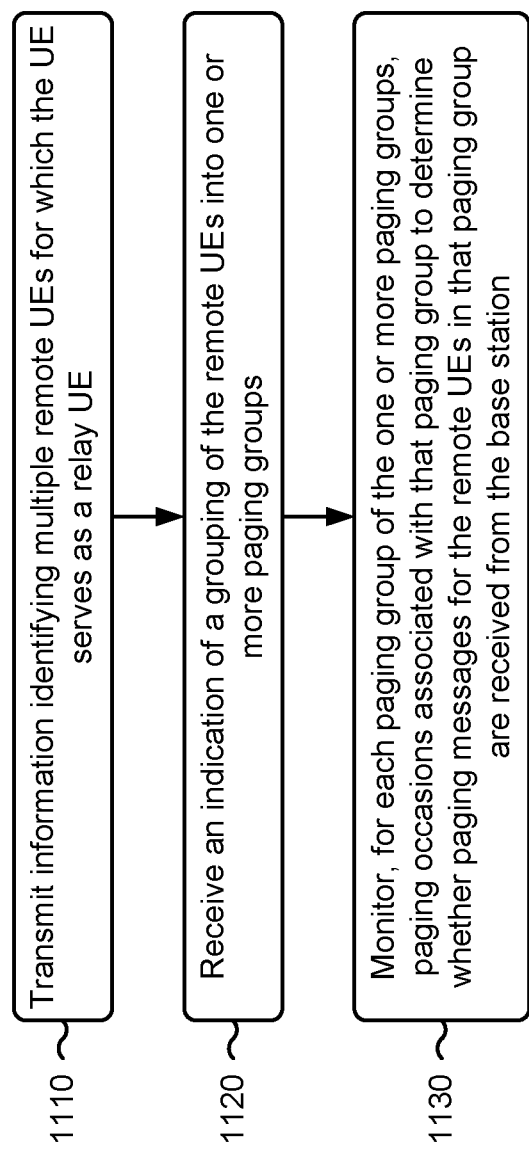

1100

1110 Transmit information identifying multiple remote UEs for which the UE serves as a relay UE 1120 Receive an indication of a grouping of the remote UEs into one or more paging groups 1130 Monitor, for each paging group of the one or more paging groups, paging occasions associated with that paging group to determine whether paging messages for the remote UEs in that paging group are received from the base station

FIG. 11

1210 — Receive information identifying multiple remote UEs for which the UE serves as a relay UE 1220 — Transmit an indication of a grouping of the remote UEs into one or more paging groups

1200

REMOTE UE GROUP PAGING FOR RELAY POWER SAVING

CROSS-REFERENCE TO RELATED APPLICATION

This Patent Application is a 371 national stage of PCT Application No. PCT/CN2021/072383 filed on Jan. 18, 2021, entitled "REMOTE UE GROUP PAGING FOR RELAY POWER SAVING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for remote user equipment (UE) group paging for relay power saving.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes transmitting, to a base station, information identifying multiple remote UEs for which the UE serves as a relay UE; receiving, from the base station, an indication of a grouping of the remote UEs into one or more paging groups; and monitoring, for each paging group of the one or more paging groups, paging occasions associated with that paging group to determine whether paging messages for the remote UEs in that paging group are received from the base station.

In some aspects, a method of wireless communication performed by a base station includes receiving, from a UE, information identifying multiple remote UEs for which the UE serves as a relay UE; and transmitting, to the UE, an indication of a grouping of the remote UEs into one or more paging groups.

In some aspects, a UE for wireless communication includes a memory and one or more processors operatively coupled to the memory, the memory and the one or more processors configured to: transmit, to a base station, information identifying multiple remote UEs for which the UE serves as a relay UE; receive, from the base station, an indication of a grouping of the remote UEs into one or more paging groups; and monitor, for each paging group of the one or more paging groups, paging occasions associated with that paging group to determine whether paging messages for the remote UEs in that paging group are received from the base station.

In some aspects, a base station for wireless communication includes a memory and one or more processors operatively coupled to the memory, the memory and the one or more processors configured to: receive, from a UE, information identifying multiple remote UEs for which the UE serves as a relay UE; and transmit, to the UE, an indication of a grouping of the remote UEs into one or more paging groups.

In some aspects, a non-transitory computer-readable medium storing a set of instructions for wireless communication includes one or more instructions that, when executed by one or more processors of a UE, cause the UE to: transmit, to a base station, information identifying multiple remote UEs for which the UE serves as a relay UE; receive, from the base station, an indication of a grouping of the remote UEs into one or more paging groups; and monitor, for each paging group of the one or more paging groups, paging occasions associated with that paging group to determine whether paging messages for the remote UEs in that paging group are received from the base station.

In some aspects, a non-transitory computer-readable medium storing a set of instructions for wireless communication includes one or more instructions that, when executed by one or more processors of a base station, cause the base station to: receive, from a UE, information identifying multiple remote UEs for which the UE serves as a relay UE; and transmit, to the UE, an indication of a grouping of the remote UEs into one or more paging groups.

In some aspects, an apparatus for wireless communication includes means for transmitting, to a base station, information identifying multiple remote UEs for which the apparatus serves as a relay UE; means for receiving, from the base station, an indication of a grouping of the remote UEs into one or more paging groups; and means for monitoring, for each paging group of the one or more paging groups, paging occasions associated with that paging group to determine whether paging messages for the remote UEs in that paging group are received from the base station.

In some aspects, an apparatus for wireless communication includes means for receiving, from a UE, information identifying multiple remote UEs for which the UE serves as a relay UE; and means for transmitting, to the UE, an indication of a grouping of the remote UEs into one or more paging groups.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 11-12 are diagrams illustrating example processes associated with remote UE group paging for relay power saving, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
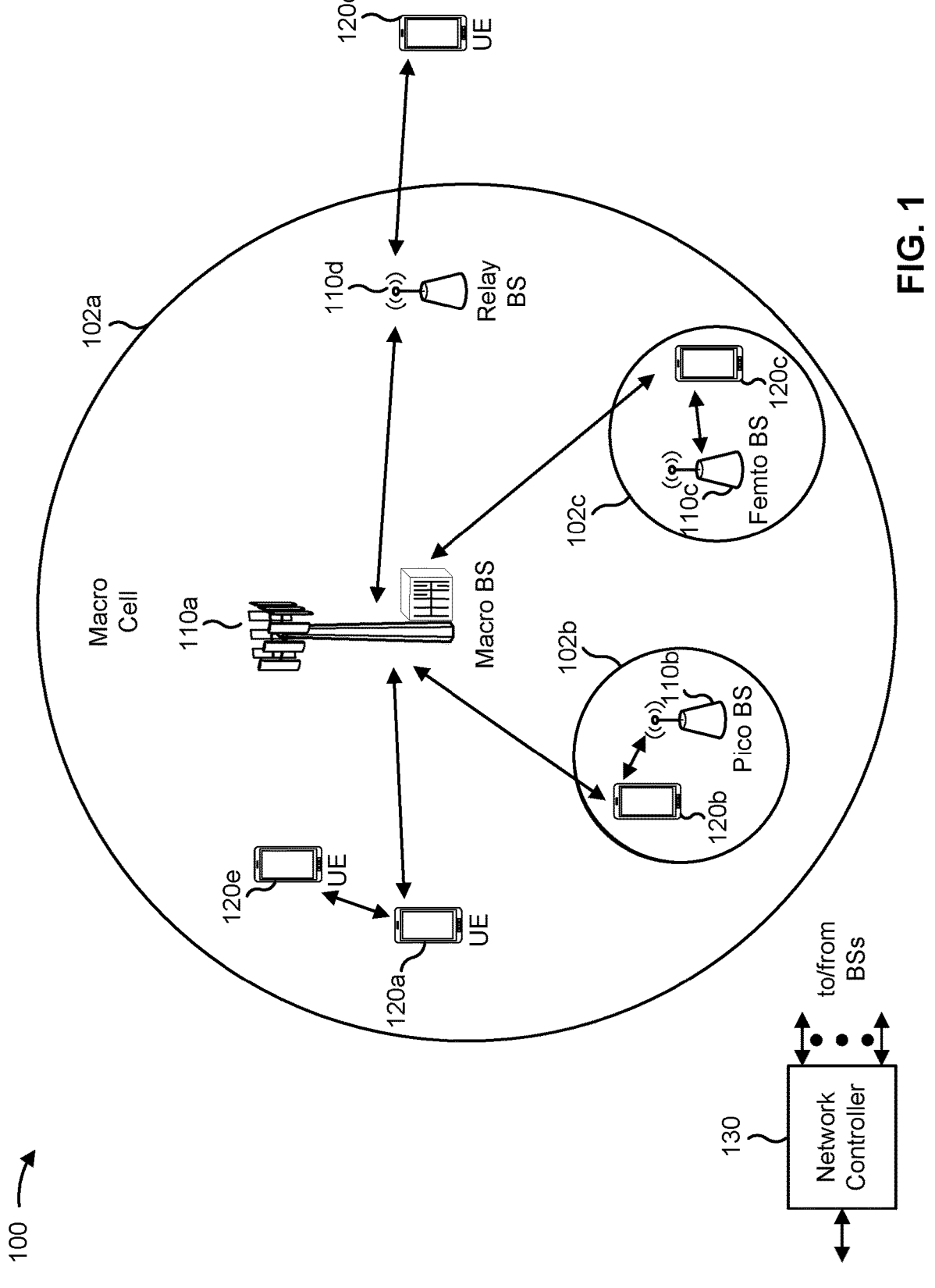
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
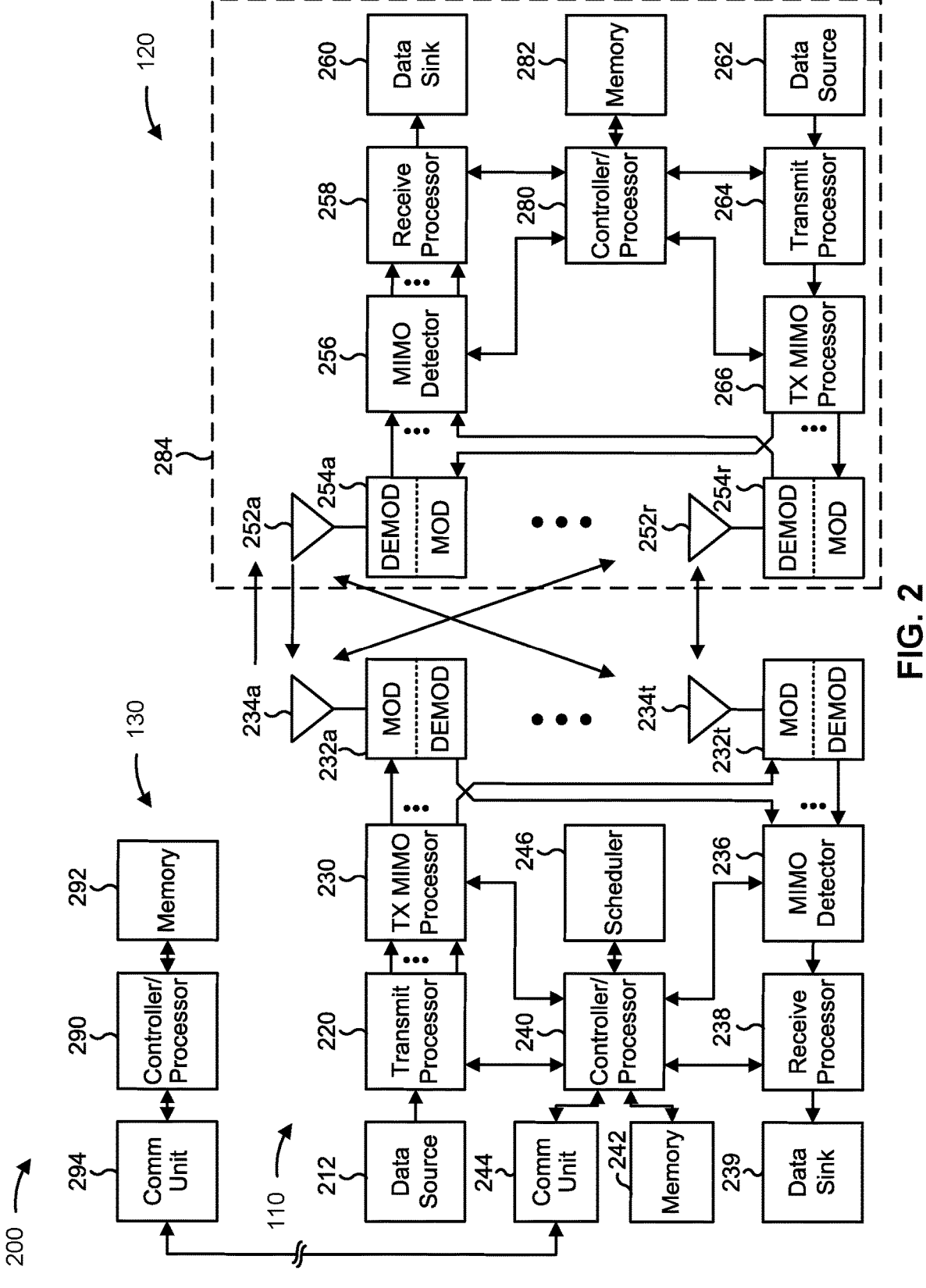
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-12.

Controller/processor 240 of base station 110, controller/processor 280 of UE 120, and/or any other component(s) of FIG. 2 may perform one or more techniques associated with remote UE group paging for relay power saving, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE 120 includes means for transmitting, to a base station, information identifying multiple remote UEs for which the UE serves as a relay UE; means for receiving, from the base station, an indication of a grouping of the remote UEs into one or more paging groups; and/or means for monitoring, for each paging group of the one or more paging groups, paging occasions associated with that paging group to determine whether paging messages for the remote UEs in that paging group are received from the base station. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, in a radio resource control (RRC) connected mode, an RRC reconfiguration message indicating, for each of the one or more paging groups, a group identifier for the paging group and a UE identifier for each remote UE included in the paging group.

In some aspects, the UE 120 includes means for receiving, in an RRC connected mode prior to switching to an RRC idle mode or an RRC inactive mode, an RRC release message indicating, for each of the one or more paging groups, a group identifier for the paging group and a UE identifier for each remote UE included in the paging group.

In some aspects, the UE 120 includes means for receiving, in an RRC idle mode or an RRC inactive mode, a system information block that indicates a mapping that maps the remote UEs to the one or more paging groups based at least in part on UE identifiers of the remote UEs.

In some aspects, the UE 120 includes means for receiving, in an RRC idle mode or an RRC inactive mode, a system information block that indicates a mapping that maps the remote UEs to the one or more paging groups based at least in part on UE types of the remote UEs.

In some aspects, the UE 120 includes means for receiving, in a paging occasion of the one or more paging occasions, a physical downlink control channel communication including an indication that a paging group of the one or more paging groups is paged in a paging message; means for receiving a physical downlink shared channel communication including the paging message and an indication of a remote UE in the paging group; and/or means for forwarding the paging message to the remote UE in the paging group.

In some aspects, the base station 110 includes means for receiving, from a UE, information identifying multiple remote UEs for which the UE serves as a relay UE; and/or means for transmitting, to the UE, an indication of a grouping of the remote UEs into one or more paging groups. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting, to the UE, an RRC reconfiguration message indicating, for each of the one or more paging groups, a group identifier for the paging group and a UE identifier for each remote UE included in the paging group.

In some aspects, the base station 110 includes means for transmitting, to the UE, an RRC release message indicating, for each of the one or more paging groups, a group identifier for the paging group and a UE identifier for each remote UE included in the paging group.

In some aspects, the base station 110 includes means for transmitting, to the UE, a system information block that indicates a mapping that maps the remote UEs to the one or more paging groups based at least in part on UE identifiers of the remote UEs.

In some aspects, the base station 110 includes means for transmitting, to the UE, a system information block that indicates a mapping that maps the remote UEs to the one or more paging groups based at least in part on UE types of the remote UEs.

In some aspects, the base station 110 includes means for transmitting, to the UE in a paging occasion associated with a paging group of the one or more paging groups, a paging message for one of the remote UEs included in the paging group.

In some aspects, the base station 110 includes means for transmitting, to the UE in a paging occasion of the one or more paging occasions, a physical downlink control channel communication including an indication that a paging group of the one or more paging groups is paged in a paging message; and/or means for transmitting a physical downlink shared channel communication including the paging message and an indication of a remote UE in the paging group.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
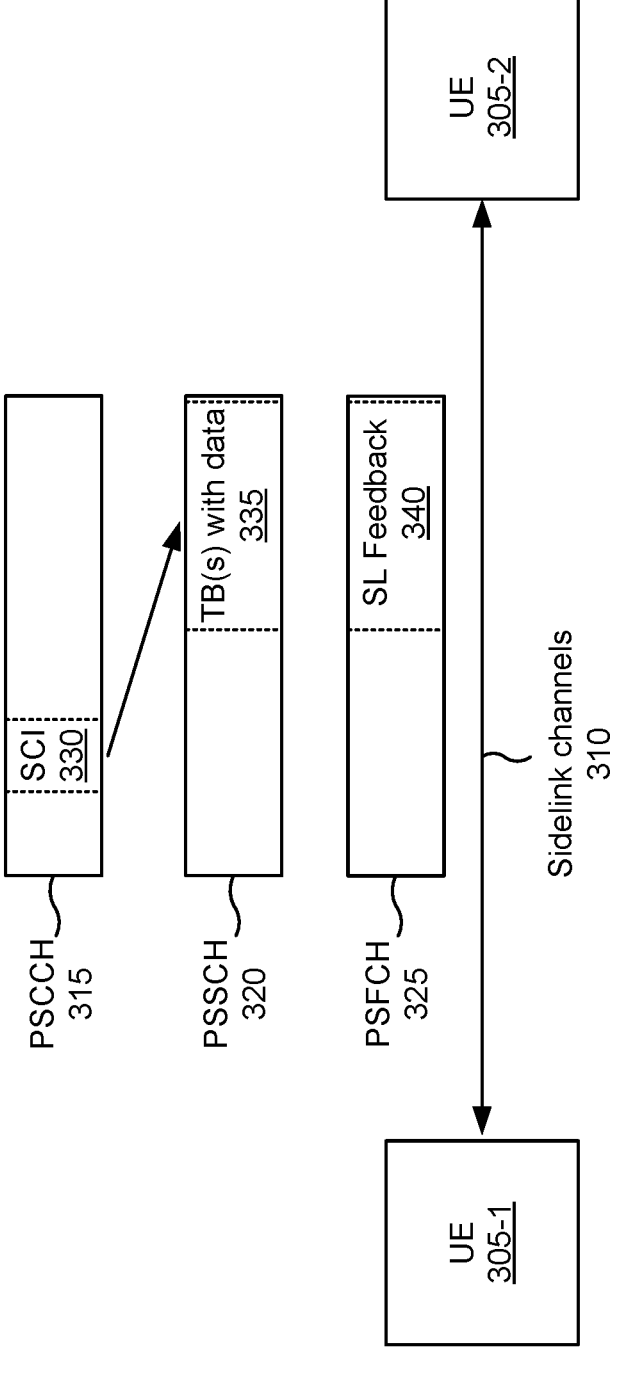
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle to pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
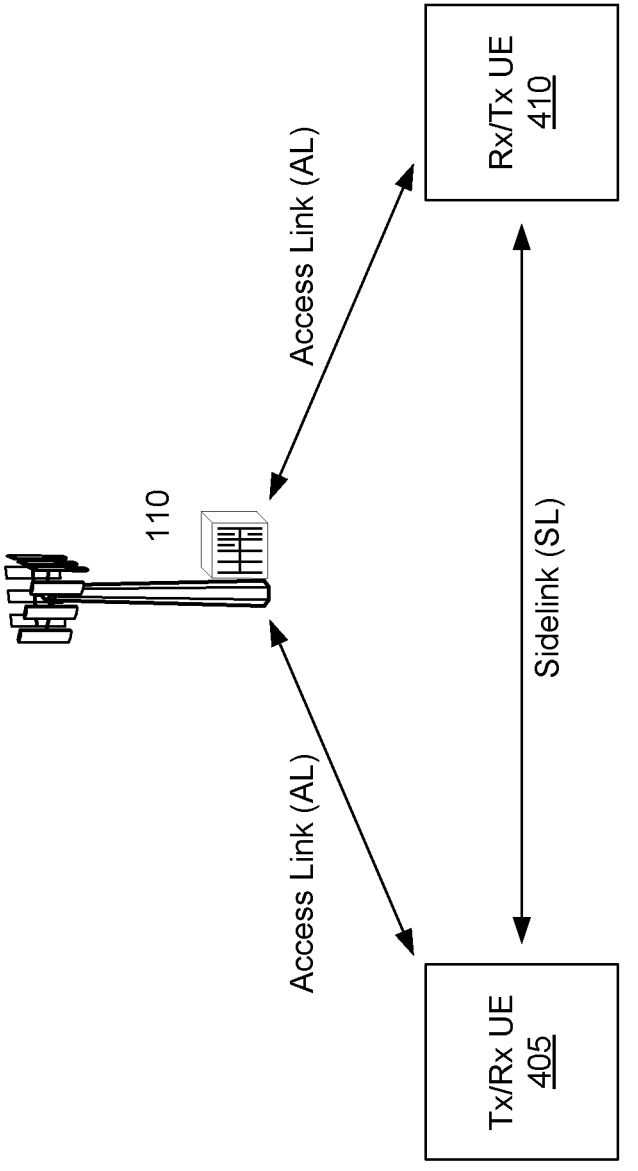
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
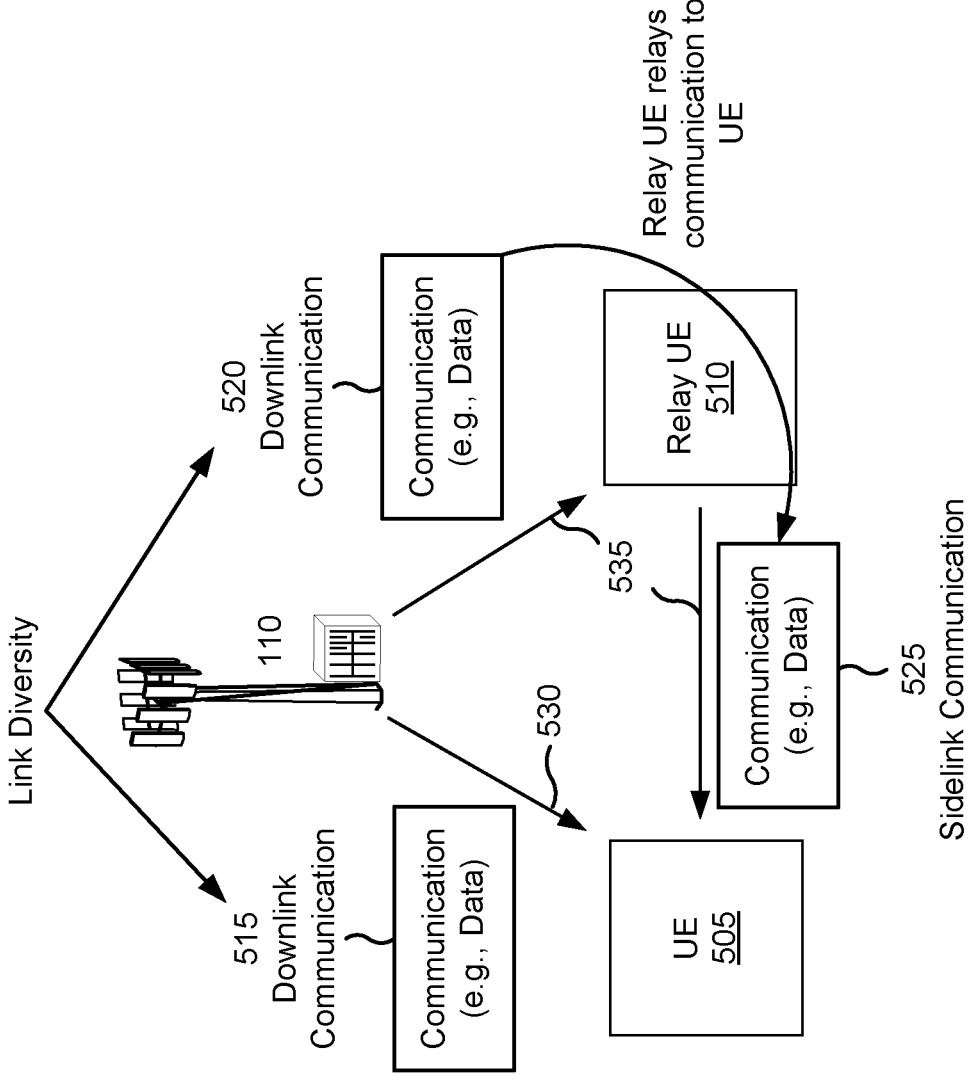
FIG. 5 is a diagram illustrating an example of a relay UE that relays communications between a UE and a base station, in accordance with various aspects of the present disclosure.

FIG. 5 is a diagram illustrating an example 500 of a relay UE that relays communications between a UE and a base station, in accordance with various aspects of the present disclosure. As shown, example 500 includes a UE 505, a relay UE 510, and a base station 110. In example 500, the UE 505 is an Rx UE, and the relay UE 510 is a Tx UE. In some aspects, the UE 505 is one UE 120, and the relay UE 510 is another UE 120. In some aspects, the UE 505 may be referred to as a remote UE.

As shown in FIG. 5, the UE 505 may receive a communication (e.g., data and/or control information) directly from the base station 110 as a downlink communication 515. Additionally, or alternatively, the UE 505 may receive a communication (e.g., data and/or control information) indirectly from the base station 110 via the relay UE 510. For example, the base station 110 may transmit the communication to the relay UE 510 as a downlink communication 520, and the relay UE 510 may relay (e.g., forward or transmit) the communication to the UE 505 as a sidelink communication 525.

In some aspects, the UE 505 may communicate directly with the base station 110 via a direct link 530. For example, the downlink communication 515 may be transmitted via the direct link 530. A communication transmitted via the direct link 530 between the UE 505 and the base station 110 (e.g., in the downlink communication 515) does not pass through and is not relayed by the relay UE 510. In some aspects, the UE 505 may communicate indirectly with the base station 110 via an indirect link 535. For example, the downlink communication 520 and the sidelink communication 525 may be transmitted via different segments of the indirect link 535. A communication transmitted via the indirect link 535 between the UE 505 and the base station 110 (e.g., in the downlink communication 520 and the sidelink communication 525) passes through and is relayed by the relay UE 510. Using the communication scheme shown in FIG. 5 may improve network performance and increase reliability by providing the UE 505 with link diversity for communicating with the base station 110.

In some cases, the UE 505 may receive a communication (e.g., the same communication) from the base station 110 via both the direct link 530 and the indirect link 535. In other cases, the base station 110 may select one of the links (e.g., either the direct link 530 or the indirect link 535) and may transmit a communication to the UE 505 using only the selected link. Alternatively, the base station 110 may receive an indication of one of the links (e.g., either the direct link 530 or the indirect link 535) and may transmit a communication to the UE 505 using only the indicated link. The indication may be transmitted by the UE 505 and/or the relay UE 510. In some aspects, such selection and/or indication may be based at least in part on channel conditions and/or link reliability.

As indicated above, FIG. 5 is provided as an example. Other examples may differ from what is described with respect to FIG. 5.

Figure 6:
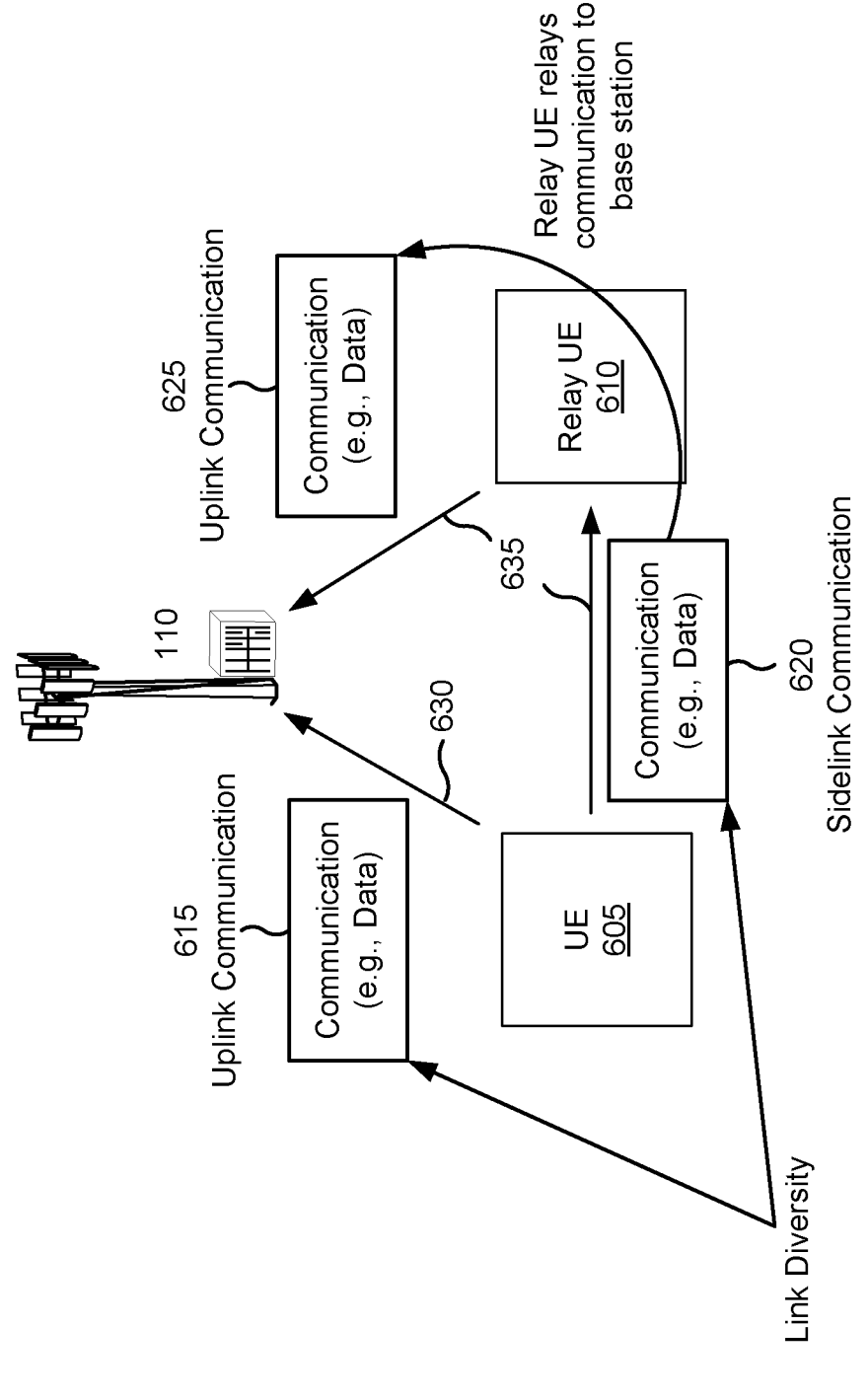
FIG. 6 is a diagram illustrating an example of a relay UE that relays communications between a UE and a base station, in accordance with various aspects of the present disclosure.

FIG. 6 is a diagram illustrating an example 600 of a relay UE that relays communications between a UE and a base station, in accordance with various aspects of the present disclosure. As shown, example 600 includes a UE 605, a relay UE 610, and a base station 110. In example 600, the UE 605 is a Tx UE, and the relay UE 610 is an Rx UE. In some aspects, the UE 605 is one UE 120, and the relay UE 610 is another UE 120. In some aspects, the UE 605 may be referred to as a remote UE.

As shown in FIG. 6, the UE 605 may transmit a communication (e.g., data and/or control information) directly to the base station 110 as an uplink communication 615. Additionally, or alternatively, the UE 605 may transmit a communication (e.g., data and/or control information) indirectly to the base station 110 via the relay UE 610. For example, the UE 605 may transmit the communication to the relay UE 610 as a sidelink communication 620, and the relay UE 610 may relay (e.g., forward or transmit) the communication to the base station 110 as an uplink communication 625.

In some aspects, the UE 605 may communicate directly with the base station 110 via a direct link 630. For example, the uplink communication 615 may be transmitted via the direct link 630. A communication transmitted via the direct link 630 between the UE 605 and the base station 110 (e.g., in the uplink communication 615) does not pass through and is not relayed by the relay UE 610. In some aspects, the UE 605 may communicate indirectly with the base station 110 via an indirect link 635. For example, the sidelink communication 620 and the uplink communication 625 may be transmitted via different segments of the indirect link 635. A communication transmitted via the indirect link 635 between the UE 605 and the base station 110 (e.g., in the sidelink communication 620 and the uplink communication 625) passes through and is relayed by the relay UE 610.

Using the communication scheme shown in FIG. 6 may improve network performance and increase reliability by providing the UE 605 with link diversity for communicating with the base station 110. For millimeter wave (e.g., frequency range 2, or FR2) communications, which are susceptible to link blockage and link impairment, this link diversity may improve reliability and prevent multiple retransmissions of data that may otherwise be retransmitted in order to achieve a successful communication. However, techniques described herein are not limited to millimeter wave communications and may be used for sub-6 gigahertz (e.g., frequency range 1, or FR1) communications.

In some cases, the UE 605 may transmit a communication (e.g., the same communication) to the base station 110 via both the direct link 630 and the indirect link 635. In other cases, the UE 605 may select one of the links (e.g., either the direct link 630 or the indirect link 635) and may transmit a communication to the base station 110 using only the selected link. Alternatively, the UE 605 may receive an indication of one of the links (e.g., either the direct link 630 or the indirect link 635) and may transmit a communication to the base station 110 using only the indicated link. The indication may be transmitted by the base station 110 and/or the relay UE 610. In some aspects, such selection and/or indication may be based at least in part on channel conditions and/or link reliability.

As indicated above, FIG. 6 is provided as an example. Other examples may differ from what is described with respect to FIG. 6.

Figure 7:
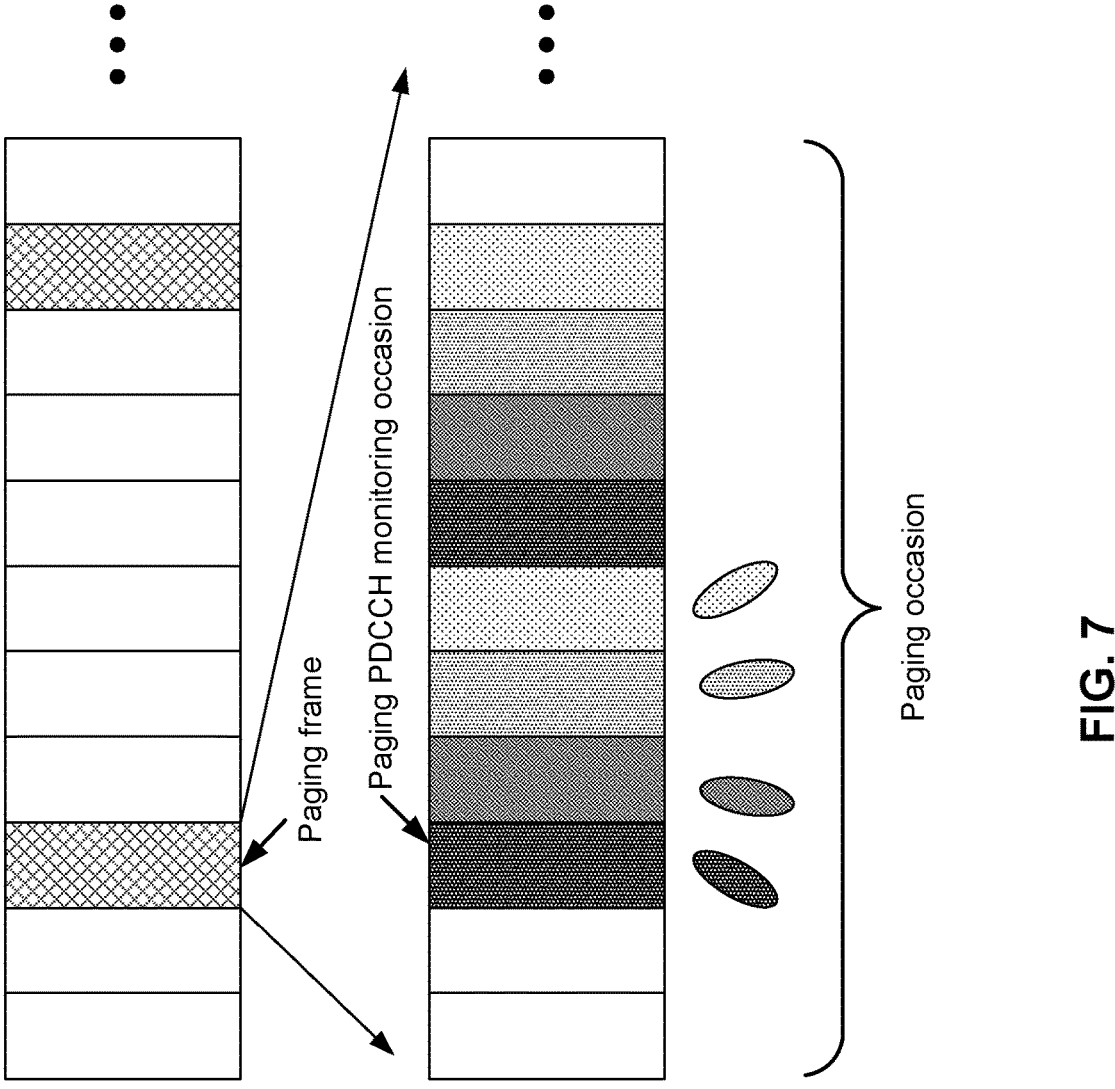
FIG. 7 is a diagram illustrating an example of a paging occasion, in accordance with various aspects of the present disclosure.

FIG. 7 is a diagram illustrating an example 700 of a paging occasion, in accordance with various aspects of the present disclosure. When a UE is in an RRC idle or inactive mode, a base station may page the UE with paging messages in predefined paging occasions to inform the UE that there is an incoming connection request, a system information update, or a short message. The UE may wake up periodically in a paging occasion during each discontinuous reception (DRX) cycle to determine whether a paging message is received from the base station during the paging occasion. During a paging occasion, the UE may monitor for a paging PDCCH communication. A paging PDCCH communication is a PDCCH communication including downlink control information (DCI) that schedules a PDSCH paging message in the paging occasion. For example, a paging PDCCH communication may include DCI with a cyclic redundancy check (CRC) scrambled by a paging radio network temporary identifier (P-RNTI). The UE may decode the DCI in a PDCCH communication received in the paging occasion. If the decoded DCI schedules a PDSCH paging message (e.g., the decoded DCI is a DCI with a CRC scrambled by P-RNTI), the UE may further decode the scheduled PDSCH paging message and determine whether the UE is paged based on the PDSCH paging message. In some cases, the paging PDCCH may include a short message field that indicates whether one or more system information blocks are updated (e.g., to alert the UE that the UE needs to receive the new SIBs) or ETWS (Earthquake and Tsunami Warning System) is available for UE to receive. In a sidelink relay scenario, a relay UE may the PDSCH paging message and/or the short message information to one or more remote UEs. The paging PDCCH may include one or both of the short message information and scheduling information for the PDSCH paging message.

As shown in FIG. 7, a paging frame may include one or more paging occasions. The network may configure paging frames and paging occasions for various UEs. In some cases, paging frames and paging occasions may be distributed based at least on part on UE identifiers (UE-IDs) associated with the UEs. For example, a system frame number (SFN) for the paging frame for a UE may be determined by $(\text{SFN}+\text{PF}_{offset})$ mod $\text{T}=(\text{T div N})^*(\text{UE}_{ID}$ mod N), and an index $(i_s)$ of the paging occasion for the UE may be determined by $i_s=\text{floor }(\text{UE}_{ID}/\text{N})$ mod $\text{N}_s$, where $\text{PF}_{offset}$ is an offset associated with the paging frame, T is a duration of the DRX cycle, N is a total number of paging frames in T, and $\text{N}_s$ is a number of paging occasions in the paging frame. As further shown in FIG. 7, within each paging occasion, the base station may use beam sweeping to transmit the paging PDCCH communication and the PDSCH paging message. The base station may repeat transmission of a paging communication and PDSCH paging message over a number of paging PDCCH monitoring occasions in the paging occasion using a same transmit beam.

As indicated above, FIG. 7 is provided as an example. Other examples may differ from what is described with respect to FIG. 7.

In some aspects, a base station may serve different UEs of different categories, different UEs that support different capabilities, and/or the like. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category and may be referred to as a reduced capability (RedCap) UE, a low tier UE, and/or an NR-Lite UE, among other examples. A UE of the first category may be, for example, an MTC UE, an eMTC UE, and/or an IoT UE, as described above in connection with FIG. 1. A UE of the second category may have an advanced feature set compared to UEs of the second category and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

In some cases, coverage for RedCap UEs may be limited, for example due to reduced antenna size and/or number.

Accordingly, RedCap UEs may benefit from sidelink communications with other UEs, such as enhanced mobile broadband (eMBB) UEs. Furthermore, for RedCap UEs, power consumption in the RRC idle/inactive mode due to paging reception may be a considerable factory in battery life, particularly when paging is repetitively performed.

In some aspects, a relay UE may perform page forwarding for one or more remote UEs served by the relay UE. A remote UE may be any UE for which a relay UE relays uplink communications to a base station and/or relays downlink communications from a base station. In order to perform page forwarding for one or more remote UEs, the relay UE may monitor paging occasions associated with the remote UEs in addition to a paging occasion associated with the relay UE. When the relay UE receives a paging message for a remote UE in a paging occasion associated with the remote UE, the relay UE may forward the paging message to the remote UE. As described above, the paging occasions for the remote UEs may be distributed based on the UE-IDs of the remote UEs. As a result, the relay UE may wake up frequently to monitor multiple paging occasions associated with the remote UEs, as well as the paging occasion associated with the relay UE. This may cause significant consumption of power and computing resources (e.g., processing resources, memory resources, communication resources, and/or the like) by the relay UE and result in decreased battery life for the relay UE.

Some techniques and apparatuses described herein enable a relay UE to monitor one or more paging occasions associated with one or more paging groups into which remote UEs are grouped. The relay UE may transmit, to a base station, information identifying multiple remote UEs served by the relay UE. The relay UE may receive, from the base station, an indication of a grouping of the remote UEs into one or more paging groups. The relay UE may monitor paging occasions associated with each paging group to determine whether paging messages for the remote UEs in the paging group are received from the base station. As a result, a number of paging occasions monitored by the relay UE may be reduced. This may allow the relay UE to remain in a sleep state for longer durations without being interrupted. Thus, consumption of power and computing resources (e.g., processing resources, memory resources, communication resources, and/or the like) by the relay UE may be reduced, and the battery life of the relay UE may be increased.

Figure 8:
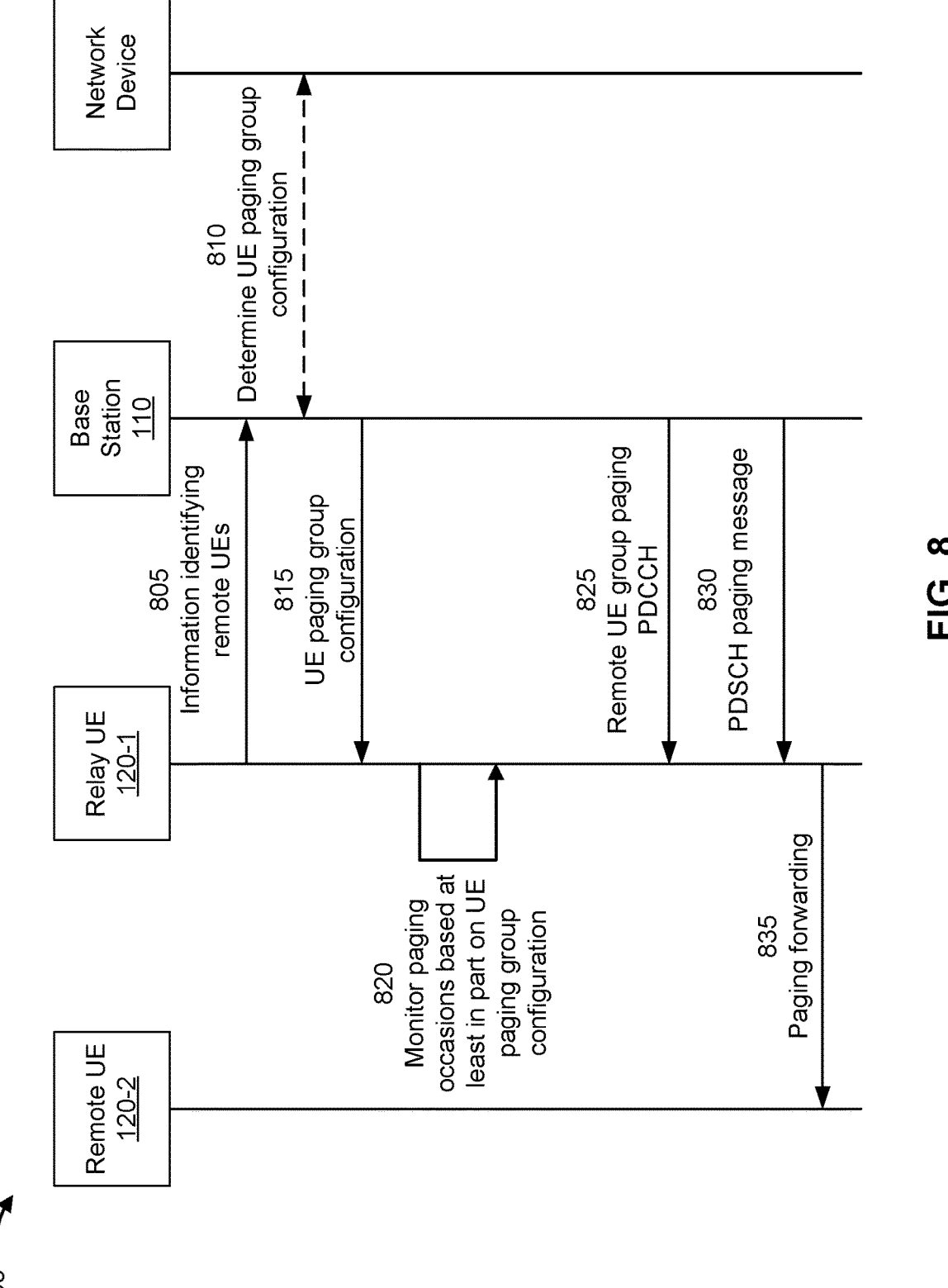
FIGS. 8-10 are diagrams illustrating examples associated with remote UE group paging for relay power saving, in accordance with various aspects of the present disclosure.

FIG. 8 is a diagram illustrating an example 800 associated with remote UE group paging for relay power saving, in accordance with various aspects of the present disclosure. As shown in FIG. 8, example 800 includes communication between a base station 110, a relay UE 120-1, a remote UE 120-2, and a network device. In some aspects, the base station 110, the relay UE 120-1, the remote UE 120-2, and the network device may be included in a wireless network, such as wireless network 100. The base station 110 and the relay UE 120-1 may communicate via a wireless access link, which may include an uplink and a downlink. The relay UE 120-1 and the remote UE 120-2 may communicate via sidelink communications. The relay UE 120-1 may relay uplink communications from the remote UE 120-2 to the base station 110 and/or relay downlink communications from the base station 110 to the remote UE 120-2. The network device may be another base station or a device in a core network (e.g., 5G core network).

As shown in FIG. 8, and by reference number 805, the relay UE 120-1 may transmit, to the base station 110, information identifying multiple remote UEs served by the relay UE 120-1. The multiple remote UEs may include the remote UE 120-2 and one or more other remote UEs for which the relay UE 120-1 relays communications to and/or from the base station 110. The information identifying the remote UEs may include respective UE-IDs associated with the remote UEs served by the relay UE 120-1. In some aspects, the relay UE 120-1 may transmit the information identifying the remote UEs to the base station 110 in an RRC message. For example, the relay UE 120-1 may transmit, to the base station 110, a "SideUEinformation" RRC message including the respective UE-IDs of the remote UEs served by the relay UE 120-1. In some aspects, the relay UE 120-1 may transmit the information identifying the remote UEs to the base station 110 in a medium access control (MAC) control element (MAC-CE).

In some aspects, the relay UE 120-1 may transmit the information identifying the remote UEs to the base station 110 based at least in part on a change in the remote UEs served by the relay UE 120-1. For example, the relay UE 120-1 may transmit information identifying an update set of remote UEs served by the relay UE 120-1 based at least in part on a new remote UE connecting with the relay UE 120-1.

As further shown in FIG. 8, and by reference number 810, the base station 110 and/or the network device may determine a UE paging group configuration based at least in part on the information identify the remote UEs served by the relay UE 120-1. The base station 110 and/or the network device may group the remote UEs served by the relay UE 120-1 into one or more paging groups. In some aspects, the base station 110 and/or the network device may group the relay UE 120-1 into one of the paging groups together with all or a subset of the remote UEs served by relay UE 120-1. In some aspects, the remote UEs may be grouped into a single paging group. In some aspects, the relay UE 120-1 and all of the remote UEs served by the relay UE 120-1 may be grouped into a single paging group. In some aspects, a paging group may include remote UEs in different idle, inactive, or connected states. For example, a paging group may include idle UEs, inactive UEs, and/or connected UEs.

Each paging group may be associated with a respective paging occasion in a paging cycle (e.g., DRX cycle). In some aspects, the number of paging groups for the remote UEs served by the relay UE 120-1 may be less than a total number of the remote UEs served by the relay UE 120-1, and a number of paging occasions corresponding to the number of paging groups may be less than a number of paging occasions corresponding to the individual remote UEs. The base station 110 and/or the network device may determine the respective paging occasion for each paging group based at least in part on a paging group identifier (ID) associated with the paging group. For example, an SFN for a paging frame for a paging group may be determined by: (SFN+ $PF_{offset}$) mod T=(T div N)*(GroupID mod N), and an index $(i_s)$ of the paging occasion for the paging group may be determined by: $i_s$=floor (GroupID/N) mod $N_s$, where $PF_{offset}$ is an offset associated with the paging frame, T is a duration of the DRX cycle, N is a total number of paging frames in T, GroupID is the paging group ID, and $N_s$ is a number of paging occasions in the paging frame.

In some aspects, the base station 110 may transmit, to the network device (e.g., a device in the core network or another base station), the information identifying the remote UEs served by the relay UE 120-1, and the network device may determine the paging group configuration that groups the remote UEs into the one or more paging groups. In some aspects, the base station 110 may receive the information identifying the remote UEs served by the relay UE 120-1, and the base station 110 may determine the paging group configuration that groups the remote UEs into the one or more paging groups based on receiving the information identifying the remote UEs.

As further shown in FIG. 8, and by reference number 815, the base station 110 may transmit, to the relay UE 120-1, an indication of the UE paging group configuration. The UE paging group configuration groups the remote UEs served by the relay UE 120-1 into one or more paging groups. In some aspects, the UE paging group configuration may group the relay UE 120-1 into one of the paging groups with at least a subset of the remote UEs served by the relay UE 120-1. The base station 110 may transmit the indication of the UE paging group configuration to the relay UE 120-1 while the relay UE 120-1 is in an RRC connected mode, an RRC idle mode, or an RRC inactive mode.

In some aspects, the base station 110 may transmit the indication of the UE paging group configuration to the relay UE 120-1 in an RRC message. For example, the base station 110 may transmit the indication of the UE paging group configuration in an RRC reconfiguration message or an RRC release message, among other examples. In some aspects, the base station 110 may broadcast a system information block (SIB) including the indication of the UE paging group configuration. For example, the SIB may include an indication of a mapping function that may be used by the relay UE 120-1 to group the remote UEs served by the relay UE 120-1 in the one or more paging groups.

As further shown in FIG. 8, and by reference number 820, the relay UE 120-1 may monitor paging occasions based at least in part on the UE paging group configuration. In some aspects, in paging cycle (e.g., DRX cycle), the relay UE 120-1 may monitor a respective paging occasion associated with each of the one or more paging groups associated with the remote UEs served by the relay UE 120-1. By monitoring, for each of the one or more paging groups, the paging occasion associated with that paging group, the relay UE 120-1 may determine whether paging messages are received from the base station 110 for the remote UEs in that paging group. In a case in which the relay UE 120-1 is grouped into one of the paging groups with at least a subset of the remote UEs served by the relay UE 120-1, the relay UE 120-1 may also monitor for paging messages for the relay UE 120-1 in the paging occasion associated with that paging group. In a case in which the relay UE 120-1 is not grouped into one of the paging groups with the remote UEs, the relay UE 120-1 may monitor a paging occasion associated with the relay UE 120-1 (or another paging group including the relay UE 120-1) in addition to the respective paging occasions associated with the paging groups that include the remote UEs served by the relay UE 120-1.

As further shown in FIG. 8, and by reference number 825, the base station 110 may transmit, to the relay UE 120-1, a remote UE group paging PDCCH communication. The base station 110 may transmit the remote UE group paging PDCCH in a paging occasion associated with a paging group that includes the remote UE 120-2 and one or more other remote UEs served by the relay UE 120-1. For example, the remote UE group paging PDCCH communication may be a PDCCH communication that includes DCI that schedules a PDSCH paging message and indicates that a paging group of remote UEs is paged in the PDSCH paging message. In some aspects, the paging PDCCH may include a short message field that indicates whether one or more SIBs are updated or ETWS is available for a remote UE to receive. For example, the paging PDCCH may include one or both of the short message information and scheduling information for the PDSCH paging message.

The relay UE 120-1 may monitor the paging occasions associated with the one or more paging groups that include the remote UEs served by the relay UE 120-1, and the relay UE 120-1 may receive the PDCCH communication transmitted by the base station 110 in the paging occasion associated with a paging group. The relay UE 120-1 may decode the PDCCH communication and determine that the PDCCH communication is a UE group paging PDCCH communication based on the DCI in the decoded PDCCH communication.

As further shown in FIG. 8, and by reference number 830, the base station 110 may transmit, to the relay UE 120-1 in the paging occasion associated with the paging group including remote UEs served by the relay UE 120-1, a PDSCH paging message. The relay UE 120-1 may receive the PDSCH paging message in the paging occasion. The relay UE 120-1 may decode the PDSCH paging message based at least in part on receiving and decoding the remote UE group paging PDCCH communication that schedules the PDSCH paging message. In some aspects, the PDSCH paging message may include an indication of a remote UE being paged in the paging group and a paging record for the remote UE being paged. Accordingly, while the PDCCH communication indicates that the paging group is being paged, the PDSCH paging message may include an indication of which remote UE in the paging group is being paged. The relay UE 120-1 may determine the remote UE being paged based on decoding the PDSCH paging message. For example, the relay UE 120-1 may determine that the remote UE 120-2 is the remote UE being paged in the paging message.

As further shown in FIG. 8, and by reference number 835, the relay UE 120-1 may forward the paging message to the remote UE 120-2 based on determining that the PDSCH paging message indicates that the remote UE 120-2 is the remote UE being paged. In some aspects, the relay UE 120-1 may forward, to the remote UE 120-2, the PDSCH paging message, for example via a PSSCH communication. In some aspects, the relay UE 120-1 may forward, to the remote UE 120-2, the remote UE group paging PDCCH communication and the PDSCH paging message. In some aspects, the relay UE 120-1 may forward the PDSCH paging message and/or short message information included in the remote UE group paging PDCCH communication to the remote UE 121-2.

As described above in connection with FIG. 8, the relay UE 120-1 may transmit, to the base station 110, information identifying multiple remote UEs served by the relay UE 120-1. The relay UE 120-1 may receive, from the base station 110, an indication of a grouping of the remote UEs into one or more paging groups. The relay UE 120-1 may monitor paging occasions associated with each paging group to determine whether paging messages for the remote UEs in the paging group are received from the base station 110. As a result, a number of paging occasions monitored by the relay UE 120-1 may be reduced. This may allow the relay UE 120-1 to remain in a sleep state for longer durations without being interrupted. Thus, consumption of power and computing resources (e.g., processing resources, memory resources, communication resources, and/or the like) by the relay UE 120-1 may be reduced, and the battery life of the relay UE 120-1 may be increased.

As indicated above, FIG. 8 is provided as an example. Other examples may differ from what is described with respect to FIG. 8.

Figure 9:
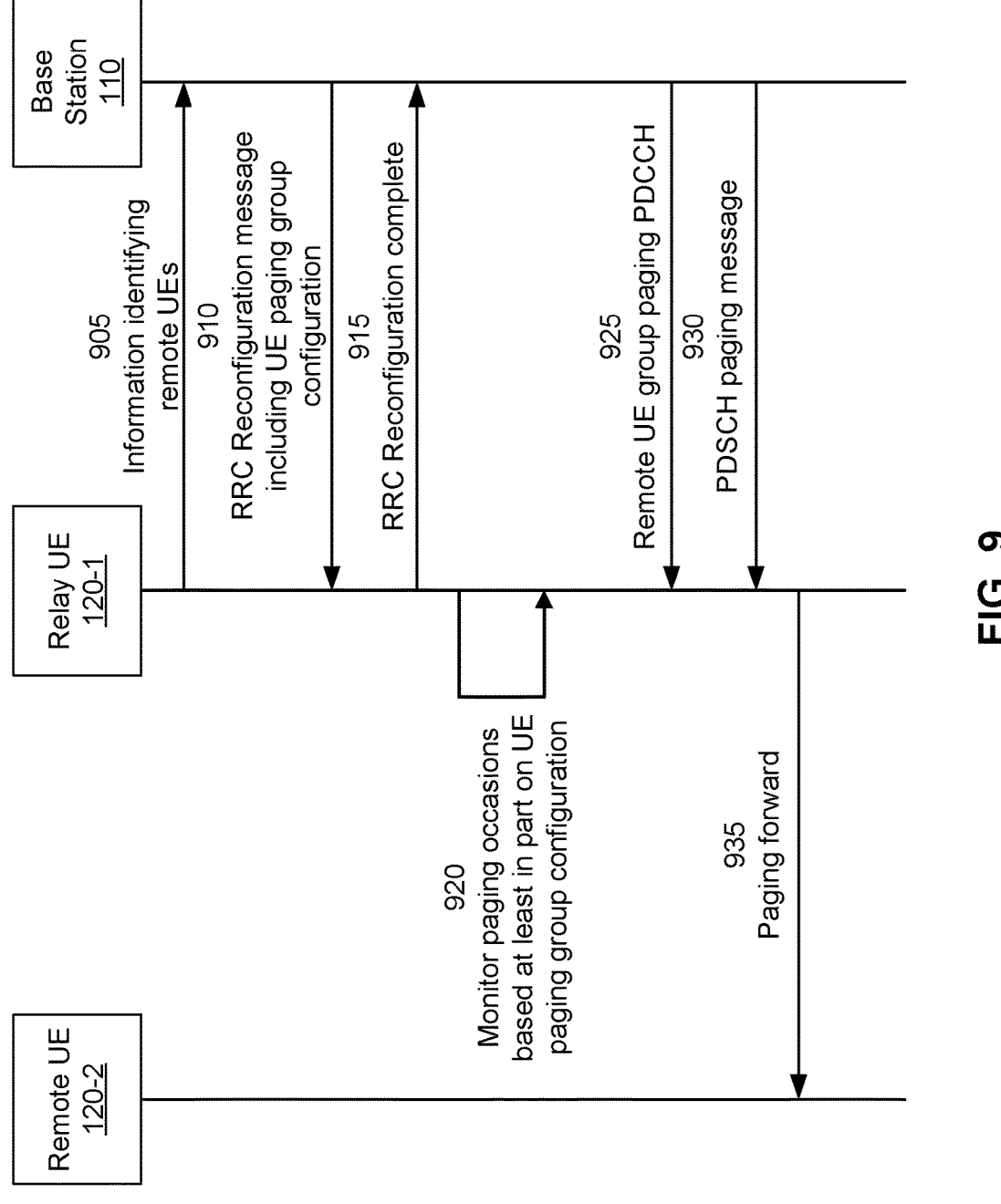

FIG. 9 is a diagram illustrating an example 900 associated with remote UE group paging for relay power saving, in accordance with various aspects of the present disclosure. As shown in FIG. 9, example 900 includes communication between a base station 110, a relay UE 120-1, and a remote UE 120-2. In some aspects, the base station 110, the relay UE 120-1, and the remote UE 120-2 may be included in a wireless network, such as wireless network 100. The base station 110 and the relay UE 120-1 may communicate via a wireless access link, which may include an uplink and a downlink. The relay UE 120-1 and the remote UE 120-2 may communicate via sidelink communications. The relay UE 120-1 may relay uplink communications from the remote UE 120-2 to the base station 110 and/or relay downlink communications from the base station 110 to the remote UE 120-2.

As shown in FIG. 9, and by reference number 905, the relay UE 120-1 may transmit, to the base station 110, information identifying multiple remote UEs served by the relay UE 120-1. The multiple remote UEs may include the remote UE 120-2 and one or more other remote UEs for which the relay UE 120-1 relays communications to and/or from the base station 110. The relay UE 120-1 may transmit the information identifying the remote UEs, such as respective UE-IDs associated with the remote UEs, as described above in connection with FIG. 8.

As further shown in FIG. 9, and by reference number 910, the base station 110 may transmit, to the relay UE 120-1, an RRC reconfiguration message including an indication of a UE paging group configuration. The base station 110 and/or a network device may determine the UE group paging configuration based at least in part on the information identifying the remote UEs served by the relay UE 120-1, as described above in connection with FIG. 8. In some aspects, the base station 110 may transmit the UE paging group configuration in the RRC reconfiguration message while the relay UE 120-1 is in the RRC connected mode. The RRC reconfiguration message may indicate the grouping of connected, idle, and/or inactive remote UEs into the paging groups. In some aspects, since the relay UE 120-1 monitors paging occasions for the paging groups including the remote UEs and forwards paging messages to the remote UEs, the RRC configuration message may be used to configure the relay UE 120-1 with the paging groups for the remote UEs without transmitting the configuration to the remote UEs served by the relay UE 120-1.

As further shown in FIG. 9, and by reference number 915, the relay UE 120-1, may transmit, to the base station 110, an RRC reconfiguration complete message. The RRC reconfiguration complete message may confirm successful configuration of the relay UE 120-1 with the UE paging group configuration indicated in the RRC reconfiguration message.

As further shown in FIG. 9, and by reference number 920, the relay UE 120-1 may monitor paging occasions based at least in part on the UE paging group configuration. The relay UE 120-1 may monitor, respective paging occasions associated with the one or more paging groups including the remote UEs served by the relay UE 120-1 in a paging cycle, as described above in connection with FIG. 8.

As further shown in FIG. 9, and by reference number 925, the base station 110 may transmit, to the relay UE 120-1, a remote UE group paging PDCCH communication. The base station 110 may transmit the remote UE group paging PDCCH communication in a paging occasion associated with a paging group that includes the remote UE 120-2 and one or more other remote UEs served by the relay UE 120-1.

The relay UE 120-1 may receive and decode the remote UE group paging PDCCH communication, as described above in connection with FIG. 8.

As further shown in FIG. 9, and by reference number 930, the base station 110 may transmit, to the relay UE 120-1, a PDSCH paging message. The PDSCH paging message may include an indication that the remote UE 120-2 is the remote UE being paged. The relay UE 120-1 may receive and decode the PDSCH paging message, as described above in connection with FIG. 8.

As further shown in FIG. 9, and by reference number 935, the relay UE 120-1 may forward the paging message to the remote UE 120-2. The relay UE 120-1 may forward the paging message and/or the remote UE group paging PDCCH to the remote UE 120-2, as described above in connection with FIG. 8.

As indicated above, FIG. 9 is provided as an example. Other examples may differ from what is described with respect to FIG. 9.

Figure 10:
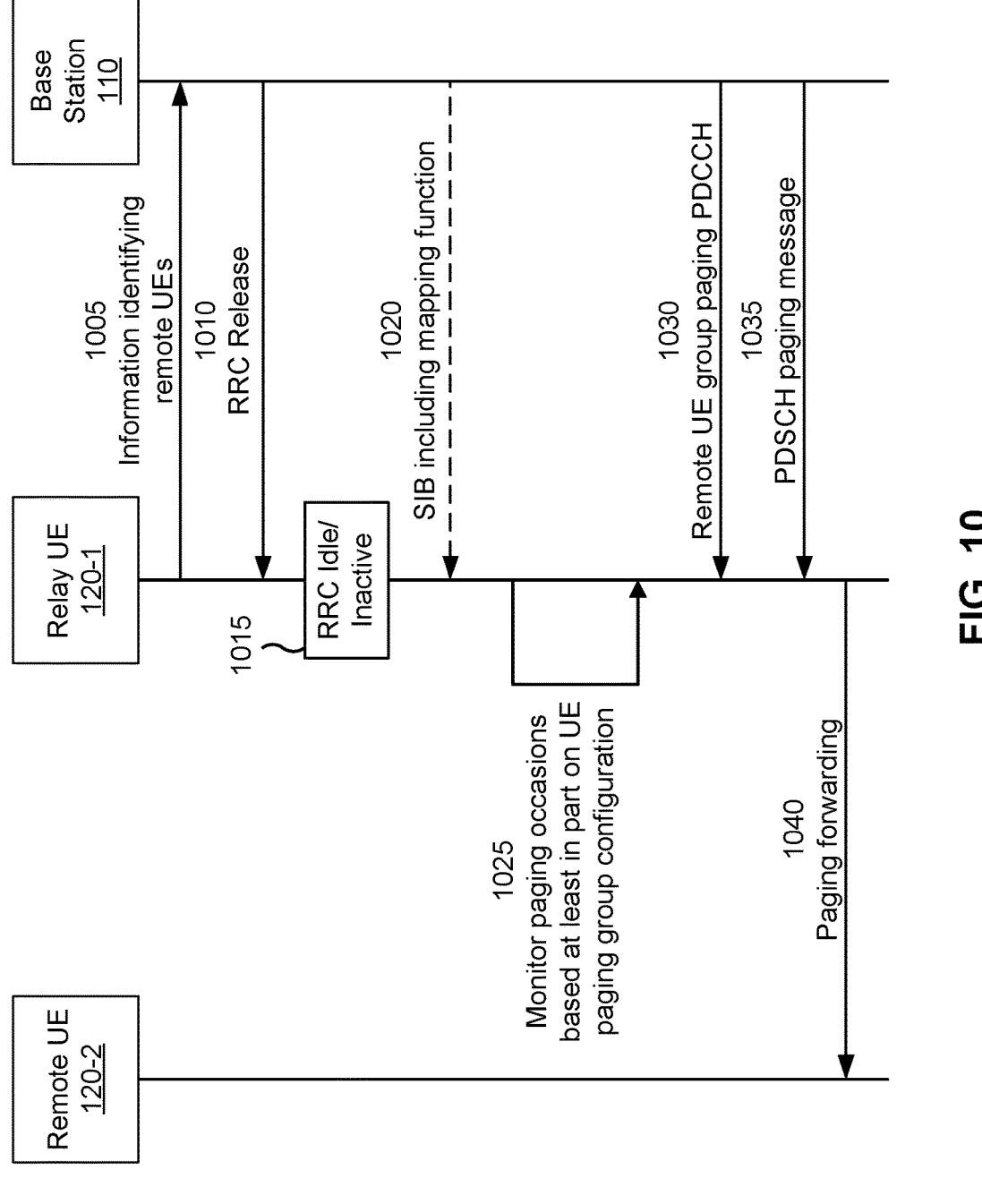

FIG. 10 is a diagram illustrating an example 1000 associated with remote UE group paging for relay power saving, in accordance with various aspects of the present disclosure. As shown in FIG. 10, example 1000 includes communication between a base station 110, a relay UE 120-1, and a remote UE 120-2. In some aspects, the base station 110, the relay UE 120-1, and the remote UE 120-2 may be included in a wireless network, such as wireless network 100. The base station 110 and the relay UE 120-1 may communicate via a wireless access link, which may include an uplink and a downlink. The relay UE 120-1 and the remote UE 120-2 may communicate via sidelink communications. The relay UE 120-1 may relay uplink communications from the remote UE 120-2 to the base station 110 and/or relay downlink communications from the base station 110 to the remote UE 120-2.

As shown in FIG. 10, and by reference number 1005, the relay UE 120-1 may transmit, to the base station 110, information identifying multiple remote UEs served by the relay UE 120-1. The multiple remote UEs may include the remote UE 120-2 and one or more other remote UEs for which the relay UE 120-1 relays communications to and/or from the base station 110. The relay UE 120-1 may transmit the information identifying the remote UEs, such as respective UE-IDs associated with the remote UEs, as described above in connection with FIG. 8.

As further shown in FIG. 10, and by reference number 1010, the base station 110 may transmit, to the relay UE 120-1, an RRC release message. The RRC release message may release the relay UE 120-1 from the RRC connected mode. In some aspects, the RRC release message may include an indication of a UE paging group configuration determined (e.g., by the base station 110 and/or a network device) based at least in part on the information identifying the remote UEs served by the relay UE 120-1. In this case, the base station 110 may transmit the RRC release message including the indication of the UE paging group configuration to configure the relay UE 120-1 with the UE paging group configuration prior to the relay UE 120-1 entering the RRC idle mode or the RRC inactive mode. Accordingly, the relay UE 120-1 may monitor the paging occasions for the paging groups and forward paging messages for the remote UEs while in the RRC idle mode or the RRC inactive mode.

As further shown in FIG. 10, and by reference number 1015, the relay UE 120-1 may enter the RRC idle mode or the RRC inactive mode. For example, the relay UE 120-1 may enter the RRC idle mode or the RRC inactive mode based at least in part on receiving the RRC release message.

As further shown in FIG. 10, and by reference number 1020, in some aspects, the base station 110 may broadcast an SIB including a mapping function that indicates a mapping of the remote UEs served by the relay UE 120-1 to the one or more paging groups. The relay UE 120-1 may receive the SIB while in the RRC idle mode or the RRC inactive mode. In some aspects, the base station 110 may broadcast the SIB including the mapping function instead of including the indication of the UE paging group configuration in the RRC release message.

The relay UE 120-1 may determine the paging groups for the remote UEs served by the relay UE 120-1 based at least in part on the mapping function. In some aspects, the mapping function may map the remote UEs to the paging groups based at least in part on the UE-IDs of the remote UEs (e.g., f(remote UE-ID)=group ID). For example, the mapping function may map the remote UEs served by the relay UE 120-1 into two paging groups based on whether a last bit of the UE-ID is odd or even. The remote UE-ID may be, for example, may be a 5G Serving Temporary Mobile Subscriber Identity (5G-S-TMSI) for an idle UE or an Inactive Radio Network Temporary Identifier (I-RNTI) for an inactive UE.

In some aspects, the mapping function may map the remote UEs to the paging groups based at least in part on UE types of the remote UEs. For example, the mapping function may map RedCap remote UEs to a first paging group and non-RedCap remote UEs to a second paging group.

As further shown in FIG. 10, and by reference number 1025, the relay UE 120-1 may monitor paging occasions based at least in part on the UE paging group configuration. The relay UE 120-1 may monitor, respective paging occasions associated with the one or more paging groups including the remote UEs served by the relay UE 120-1 in a paging cycle, as described above in connection with FIG. 8.

As further shown in FIG. 10, and by reference number 1030, the base station 110 may transmit, to the relay UE 120-1, a remote UE group paging PDCCH communication. The base station 110 may transmit the remote UE group paging PDCCH communication in a paging occasion associated with a paging group that includes the remote UE 120-2 and one or more other remote UEs served by the relay UE 120-1. The relay UE 120-1 may receive and decode the remote UE group paging PDCCH communication, as described above in connection with FIG. 8.

As further shown in FIG. 10, and by reference number 1035, the base station 110 may transmit, to the relay UE 120-1, a PDSCH paging message. The PDSCH paging message may include an indication that the remote UE 120-2 is the remote UE being paged. The relay UE 120-1 may receive and decode the PDSCH paging message, as described above in connection with FIG. 8.

As further shown in FIG. 10, and by reference number 1040, the relay UE 120-1 may forward the paging message to the remote UE 120-2. The relay UE 120-1 may forward the paging message and/or the remote UE group paging PDCCH to the remote UE 120-2, as described above in connection with FIG. 8.

As indicated above, FIG. 10 is provided as an example. Other examples may differ from what is described with respect to FIG. 10.

FIG. 11 is a diagram illustrating an example process 1100 performed, for example, by a UE, in accordance with various aspects of the present disclosure. Example process 1100 is an example where the UE (e.g., UE 120) performs operations associated with remote UE group paging for relay power saving.

As shown in FIG. 11, in some aspects, process 1100 may include transmitting, to a base station, information identifying multiple remote UEs for which the UE serves as a relay UE (block 1110). For example, the UE (e.g., using transmission component 1304, depicted in FIG. 13) may transmit, to a base station, information identifying multiple remote UEs for which the UE serves as a relay UE, as described above.

As further shown in FIG. 11, in some aspects, process 1100 may include receiving, from the base station, an indication of a grouping of the remote UEs into one or more paging groups (block 1120). For example, the UE (e.g., using reception component 1302, depicted in FIG. 13) may receive, from the base station, an indication of a grouping of the remote UEs into one or more paging groups, as described above.

As further shown in FIG. 11, in some aspects, process 1100 may include monitoring, for each paging group of the one or more paging groups, paging occasions associated with that paging group to determine whether paging messages for the remote UEs in that paging group are received from the base station (block 1130). For example, the UE (e.g., using monitoring component 1308, depicted in FIG. 13) may monitor, for each paging group of the one or more paging groups, paging occasions associated with that paging group to determine whether paging messages for the remote UEs in that paging group are received from the base station, as described above.

Process 1100 may include additional aspects, such as any single aspect or any combination of aspects described below and/or in connection with one or more other processes described elsewhere herein.

In a first aspect, the UE is included in a paging group of the one or more paging groups.

In a second aspect, alone or in combination with the first aspect, the remote UEs and the UE are grouped into a single paging group.

In a third aspect, alone or in combination with one or more of the first and second aspects, receiving the indication comprises receiving, in an RRC connected mode, an RRC reconfiguration message indicating, for each of the one or more paging groups, a group identifier for the paging group and a UE identifier for each remote UE included in the paging group.

In a fourth aspect, alone or in combination with one or more of the first and second aspects, receiving the indication comprises receiving, in an RRC connected mode prior to switching to an RRC idle mode or an RRC inactive mode, an RRC release message indicating, for each of the one or more paging groups, a group identifier for the paging group and a UE identifier for each remote UE included in the paging group.

In a fifth aspect, alone or in combination with one or more of the first and second aspects, receiving the indication comprises receiving, in an RRC idle mode or an RRC inactive mode, a system information block that indicates a mapping that maps the remote UEs to the one or more paging groups based at least in part on UE identifiers of the remote UEs.

In a sixth aspect, alone or in combination with one or more of the first and second aspects, receiving the indication comprises receiving, in an RRC idle mode or an RRC inactive mode, a system information block that indicates a mapping that maps the remote UEs to the one or more paging groups based at least in part on UE types of the remote UEs.

In a seventh aspect, alone or in combination with one or more of the first through sixth aspects, process 1100 includes receiving, in a paging occasion of the one or more paging occasions, a physical downlink control channel communication including an indication that a paging group of the one or more paging groups is paged in a paging message, receiving a physical downlink shared channel communication including the paging message and an indication of a remote UE in the paging group, and forwarding the paging message to the remote UE in the paging group.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
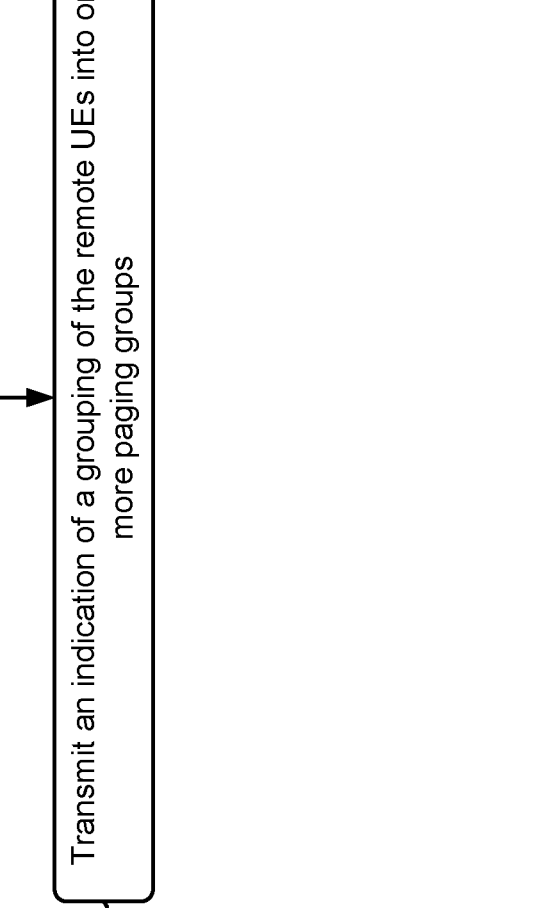

FIG. 12 is a diagram illustrating an example process 1200 performed, for example, by a base station, in accordance with various aspects of the present disclosure. Example process 1200 is an example where the base station (e.g., base station 110) performs operations associated with remote UE group paging for relay power saving.

As shown in FIG. 12, in some aspects, process 1200 may include receiving, from a UE, information identifying multiple remote UEs for which the UE serves as a relay UE (block 1210). For example, the base station (e.g., using reception component 1402, depicted in FIG. 14) may receive, from a UE, information identifying multiple remote UEs for which the UE serves as a relay UE, as described above.

As further shown in FIG. 12, in some aspects, process 1200 may include transmitting, to the UE, an indication of a grouping of the remote UEs into one or more paging groups (block 1220). For example, the base station (e.g., using transmission component 1404, depicted in FIG. 14) may transmit, to the UE, an indication of a grouping of the remote UEs into one or more paging groups, as described above.

Process 1200 may include additional aspects, such as any single aspect or any combination of aspects described below and/or in connection with one or more other processes described elsewhere herein.

In a first aspect, the UE is included in a paging group of the one or more paging groups.

In a second aspect, alone or in combination with the first aspect, the remote UEs and the UE are grouped into a single paging group.

In a third aspect, alone or in combination with one or more of the first and second aspects, transmitting the indication comprises transmitting, to the UE, an RRC reconfiguration message indicating, for each of the one or more paging groups, a group identifier for the paging group and a UE identifier for each remote UE included in the paging group.

In a fourth aspect, alone or in combination with one or more of the first and second aspects, transmitting the indication comprises transmitting, to the UE, an RRC release message indicating, for each of the one or more paging groups, a group identifier for the paging group and a UE identifier for each remote UE included in the paging group.

In a fifth aspect, alone or in combination with one or more of the first and second aspects, transmitting the indication comprises transmitting, to the UE, a system information block that indicates a mapping that maps the remote UEs to the one or more paging groups based at least in part on UE identifiers of the remote UEs.

In a sixth aspect, alone or in combination with one or more of the first and second aspects, transmitting the indication comprises transmitting, to the UE, a system information block that indicates a mapping that maps the remote UEs to the one or more paging groups based at least in part on UE types of the remote UEs.

In a seventh aspect, alone or in combination with one or more of the first through sixth aspects, process 1200 includes transmitting, to the UE in a paging occasion associated with a paging group of the one or more paging groups, a paging message for one of the remote UEs included in the paging group.

In an eighth aspect, alone or in combination with one or more of the first through seventh aspects, process 1200 includes transmitting, to the UE in a paging occasion of the one or more paging occasions, a physical downlink control channel communication including an indication that a paging group of the one or more paging groups is paged in a paging message, and transmitting a physical downlink shared channel communication including the paging message and an indication of a remote UE in the paging group.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
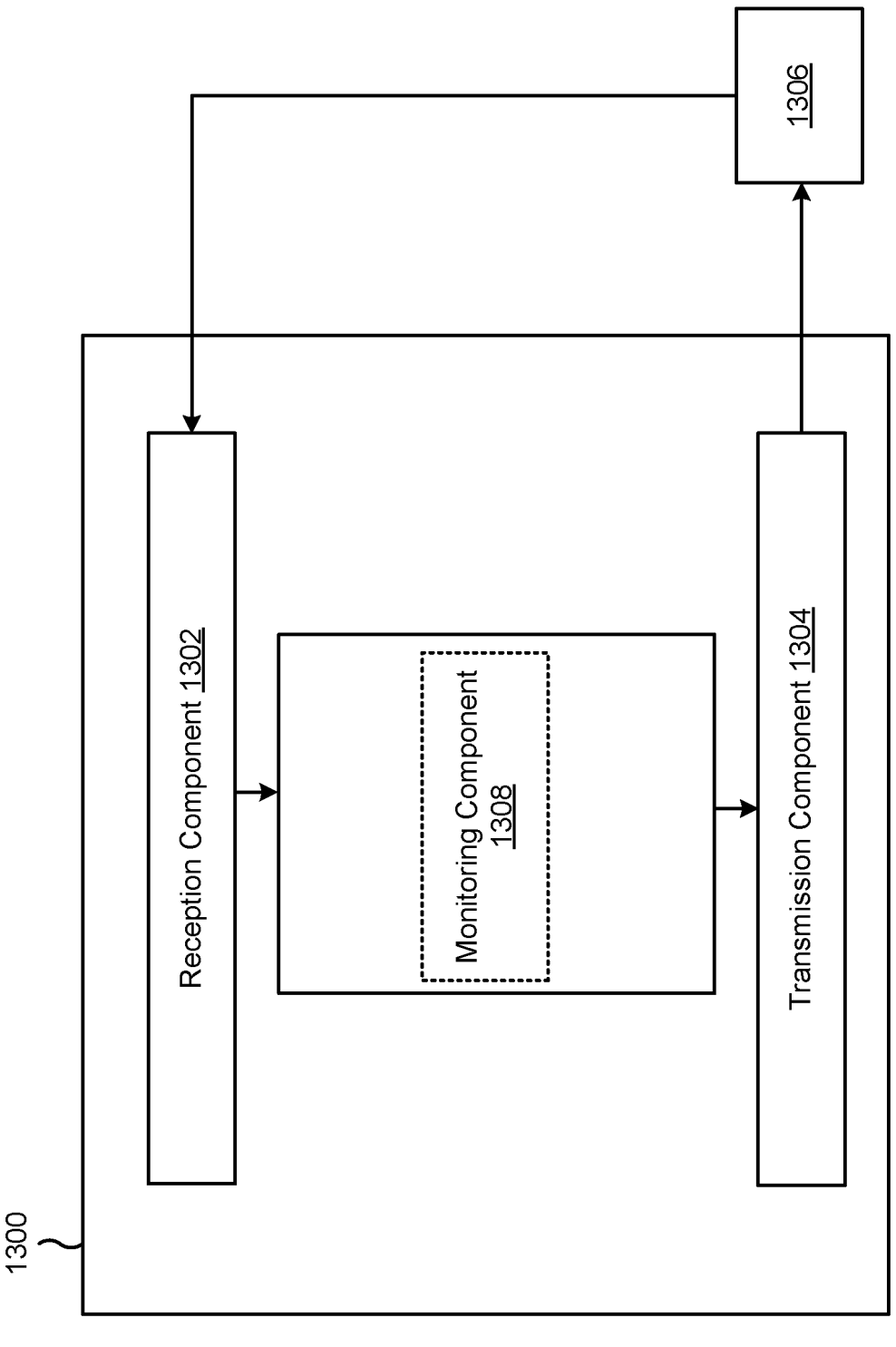
FIGS. 13-14 are block diagrams of example apparatuses for wireless communication, in accordance with various aspects of the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a monitoring component 1308, among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The transmission component 1304 may transmit, to a base station, information identifying multiple remote UEs for which the UE serves as a relay UE. The reception component 1302 may receive, from the base station, an indication of a grouping of the remote UEs into one or more paging groups. The monitoring component 1308 may monitor, for each paging group of the one or more paging groups, paging occasions associated with that paging group to determine whether paging messages for the remote UEs in that paging group are received from the base station.

The reception component 1302 may receive, in a paging occasion of the one or more paging occasions, a physical downlink control channel communication including an indication that a paging group of the one or more paging groups is paged in a paging message.

The reception component 1302 may receive a physical downlink shared channel communication including the paging message and an indication of a remote UE in the paging group.

The transmission component 1304 may forward the paging message to the remote UE in the paging group.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
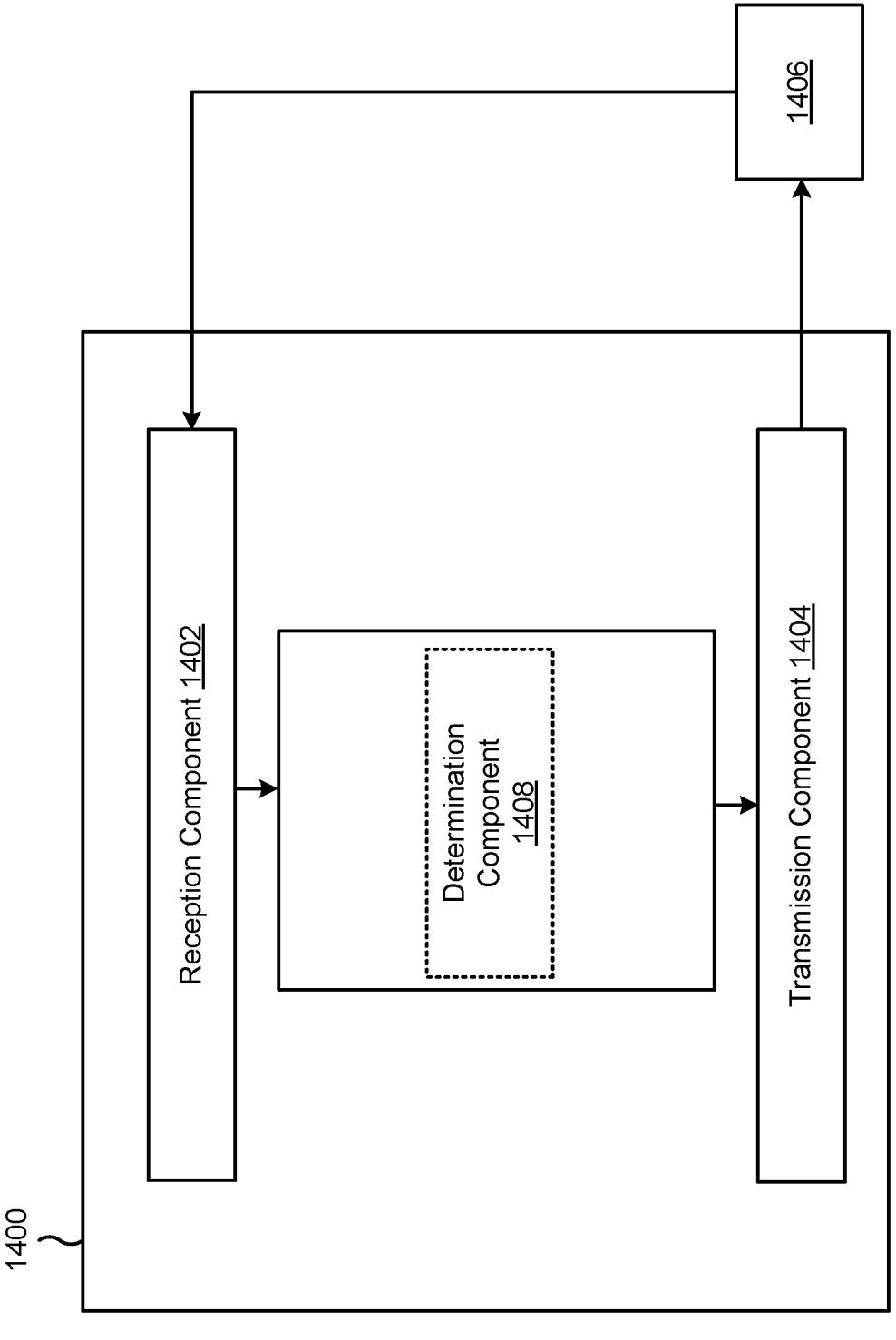

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The reception component 1402 may receive, from a UE, information identifying multiple remote UEs for which the UE serves as a relay UE. The transmission component 1404 may transmit, to the UE, an indication of a grouping of the remote UEs into one or more paging groups. The determination component 1408 may determine the grouping of the remote UEs into the one or more paging groups.

The transmission component 1404 may transmit, to the UE in a paging occasion associated with a paging group of the one or more paging groups, a paging message for one of the remote UEs included in the paging group.

The transmission component 1404 may transmit, to the UE in a paging occasion of the one or more paging occasions, a physical downlink control channel communication including an indication that a paging group of the one or more paging groups is paged in a paging message.

The transmission component 1404 may transmit a physical downlink shared channel communication including the paging message and an indication of a remote UE in the paging group.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some aspects of the present disclosure:

Aspect 1: A method of wireless communication performed by a user equipment (UE), comprising: transmitting, to a base station, information identifying multiple remote UEs for which the UE serves as a relay UE; receiving, from the base station, an indication of a grouping of the remote UEs into one or more paging groups; and monitoring, for each paging group of the one or more paging groups, paging occasions associated with that paging group to determine whether paging messages for the remote UEs in that paging group are received from the base station.

Aspect 2: The method of aspect 1, wherein the UE is included in a paging group of the one or more paging groups.

Aspect 3: The method of any of aspects 1-2, wherein the remote UEs and the UE are grouped into a single paging group.

Aspect 4: The method of any of aspects 1-3, wherein receiving the indication comprises: receiving, in a radio resource control (RRC) connected mode, an RRC reconfiguration message indicating, for each of the one or more paging groups, a group identifier for the paging group and a UE identifier for each remote UE included in the paging group.

Aspect 5: The method of any of aspects 1-3, wherein receiving the indication comprises: receiving, in a radio resource control (RRC) connected mode prior to switching to an RRC idle mode or an RRC inactive mode, an RRC release message indicating, for each of the one or more paging groups, a group identifier for the paging group and a UE identifier for each remote UE included in the paging group.

Aspect 6: The method of any of aspects 1-3, wherein receiving the indication comprises: receiving, in a radio resource control (RRC) idle mode or an RRC inactive mode, a system information block that indicates a mapping that maps the remote UEs to the one or more paging groups based at least in part on UE identifiers of the remote UEs.

Aspect 7: The method of any of aspects 1-3, wherein receiving the indication comprises: receiving, in a radio resource control (RRC) idle mode or an RRC inactive mode, a system information block that indicates a mapping that maps the remote UEs to the one or more paging groups based at least in part on UE types of the remote UEs.

Aspect 8: The method of any of aspects 1-7, further comprising: receiving, in a paging occasion of the one or more paging occasions, a physical downlink control channel communication including an indication that a paging group of the one or more paging groups is paged in a paging message; receiving a physical downlink shared channel communication including the paging message and an indication of a remote UE in the paging group; and forwarding the paging message to the remote UE in the paging group.

Aspect 9: A method of wireless communication performed by a base station, comprising: receiving, from a user equipment (UE), information identifying multiple remote UEs for which the UE serves as a relay UE; and transmitting, to the UE, an indication of a grouping of the remote UEs into one or more paging groups.

Aspect 10: The method of aspect 9, wherein the UE is included in a paging group of the one or more paging groups.

Aspect 11: The method of any of aspects 9-10, wherein the remote UEs and the UE are grouped into a single paging group.

Aspect 12: The method of any of aspects 9-11, wherein transmitting the indication comprises: transmitting, to the UE, a radio resource control (RRC) reconfiguration message indicating, for each of the one or more paging groups, a group identifier for the paging group and a UE identifier for each remote UE included in the paging group.

Aspect 13: The method of any of aspects 9-11, wherein transmitting the indication comprises: transmitting, to the UE, a radio resource control (RRC) release message indicating, for each of the one or more paging groups, a group identifier for the paging group and a UE identifier for each remote UE included in the paging group.

Aspect 14: The method of aspect 9, wherein transmitting the indication comprises: transmitting, to the UE, a system information block that indicates a mapping that maps the remote UEs to the one or more paging groups based at least in part on UE identifiers of the remote UEs.

Aspect 15: The method of any of aspects 9-11, wherein transmitting the indication comprises: transmitting, to the UE, a system information block that indicates a mapping that maps the remote UEs to the one or more paging groups based at least in part on UE types of the remote UEs.

Aspect 16: The method of any of aspects 9-15, further comprising: transmitting, to the UE in a paging occasion associated with a paging group of the one or more paging groups, a paging message for one of the remote UEs included in the paging group.

Aspect 17: The method of any of aspects 9-16, further comprising: transmitting, to the UE in a paging occasion of the one or more paging occasions, a physical downlink control channel communication including an indication that a paging group of the one or more paging groups is paged in a paging message; and transmitting a physical downlink shared channel communication including the paging message and an indication of a remote UE in the paging group.

Aspect 18: An apparatus for wireless communication at a device, comprising a processor; memory coupled with the processor; and instructions stored in the memory and executable by the processor to cause the apparatus to perform the method of one or more aspects of aspects 1-8.

Aspect 19: An apparatus for wireless communication at a device, comprising a processor; memory coupled with the processor; and instructions stored in the memory and executable by the processor to cause the apparatus to perform the method of one or more aspects of aspects 9-17.

Aspect 20: A device for wireless communication, comprising a memory and one or more processors coupled to the memory, the memory and the one or more processors configured to perform the method of one or more aspects of aspects 1-8.

Aspect 21: A device for wireless communication, comprising a memory and one or more processors coupled to the memory, the memory and the one or more processors configured to perform the method of one or more aspects of aspects 9-17.

Aspect 22: An apparatus for wireless communication, comprising at least one means for performing the method of one or more aspects of aspects 1-8.

Aspect 23: An apparatus for wireless communication, comprising at least one means for performing the method of one or more aspects of aspects 9-17.

Aspect 24: A non-transitory computer-readable medium storing code for wireless communication, the code comprising instructions executable by a processor to perform the method of one or more aspects of aspects 1-8.

Aspect 25: A non-transitory computer-readable medium storing code for wireless communication, the code comprising instructions executable by a processor to perform the method of one or more aspects of aspects 9-17.

Aspect 26: A non-transitory computer-readable medium storing a set of instructions for wireless communication, the set of instructions comprising one or more instructions that, when executed by one or more processors of a device, cause the device to perform the method of one or more aspects of aspects 1-8.

Aspect 27: A non-transitory computer-readable medium storing a set of instructions for wireless communication, the set of instructions comprising one or more instructions that, when executed by one or more processors of a device, cause the device to perform the method of one or more aspects of aspects 9-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station, information identifying multiple remote UEs for which the UE serves as a relay UE;
   receiving, from the base station, an indication of a grouping of the remote UEs into one or more paging groups;
   monitoring, for each paging group of the one or more paging groups, one or more paging occasions associated with that paging group to determine whether paging messages for the remote UEs in that paging group are received from the base station;
   receiving, in a paging occasion of the one or more paging occasions, a physical downlink control channel communication including an indication that a paging group of the one or more paging groups is paged in a paging message;
   receiving a physical downlink shared channel communication including the paging message and an indication of a remote UE in the paging group; and forwarding the paging message to the remote UE in the paging group.

2. The method of claim 1, wherein the UE is included in a paging group of the one or more paging groups.

3. The method of claim 1, wherein the remote UEs and the UE are grouped into a single paging group.

4. The method of claim 1, wherein receiving the indication comprises:
   receiving, in a radio resource control (RRC) connected mode, an RRC reconfiguration message indicating, for each of the one or more paging groups, a group identifier for the paging group and a UE identifier for each remote UE included in the paging group.

5. The method of claim 1, wherein receiving the indication comprises:
   receiving, in a radio resource control (RRC) connected mode prior to switching to an RRC idle mode or an RRC inactive mode, an RRC release message indicating, for each of the one or more paging groups, a group identifier for the paging group and a UE identifier for each remote UE included in the paging group.

6. The method of claim 1, wherein receiving the indication comprises:
   receiving, in a radio resource control (RRC) idle mode or an RRC inactive mode, a system information block that indicates a mapping that maps the remote UEs to the one or more paging groups based at least in part on UE identifiers of the remote UEs.

7. The method of claim 1, wherein receiving the indication comprises:
   receiving, in a radio resource control (RRC) idle mode or an RRC inactive mode, a system information block that indicates a mapping that maps the remote UEs to the one or more paging groups based at least in part on UE types of the remote UEs.

8. A method of wireless communication performed by a base station, comprising:
   receiving, from a user equipment (UE), information identifying multiple remote UEs for which the UE serves as a relay UE;
   transmitting, to the UE, an indication of a grouping of the remote UEs into one or more paging groups;
   transmitting, to the UE in a paging occasion of one or more paging occasions, a physical downlink control channel communication including an indication that a paging group of the one or more paging groups is paged in a paging message; and
   transmitting a physical downlink shared channel communication including the paging message and an indication of a remote UE in the paging group.

9. The method of claim 8, wherein the UE is included in a paging group of the one or more paging groups.

10. The method of claim 8, wherein the remote UEs and the UE are grouped into a single paging group.

11. The method of claim 8, wherein transmitting the indication comprises:
   transmitting, to the UE, a radio resource control (RRC) reconfiguration message indicating, for each of the one or more paging groups, a group identifier for the paging group and a UE identifier for each remote UE included in the paging group.

12. The method of claim 8, wherein transmitting the indication comprises:
   transmitting, to the UE, a radio resource control (RRC) release message indicating, for each of the one or more paging groups, a group identifier for the paging group and a UE identifier for each remote UE included in the paging group.

13. The method of claim 8, wherein transmitting the indication comprises:

transmitting, to the UE, a system information block that indicates a mapping that maps the remote UEs to the one or more paging groups based at least in part on UE identifiers of the remote UEs.

14. The method of claim 8, wherein transmitting the indication comprises:

transmitting, to the UE, a system information block that indicates a mapping that maps the remote UEs to the one or more paging groups based at least in part on UE types of the remote UEs.

15. The method of claim 8, further comprising:

transmitting, to the UE in a paging occasion associated with a paging group of the one or more paging groups, a paging message for one of the remote UEs included in the paging group.

16. A user equipment (UE) for wireless communication, comprising:

one or more memories; and one or more processors operatively coupled to the one or more memories, the one or more memories and the one or more processors configured to:

transmit, to a base station, information identifying multiple remote UEs for which the UE serves as a relay UE;

receive, from the base station, an indication of a grouping of the remote UEs into one or more paging groups;

monitor, for each paging group of the one or more paging groups, one or more paging occasions associated with that paging group to determine whether paging messages for the remote UEs in that paging group are received from the base station;

receive, in a paging occasion of the one or more paging occasions, a physical downlink control channel communication including an indication that a paging group of the one or more paging groups is paged in a paging message;

receive a physical downlink shared channel communication including the paging message and an indication of a remote UE in the paging group; and forward the paging message to the remote UE in the paging group.

17. The UE of claim 16, wherein the one or more processors, when receiving the indication, are configured to:

receive, in a radio resource control (RRC) connected mode, an RRC reconfiguration message indicating, for each of the one or more paging groups, a group identifier for the paging group and a UE identifier for each remote UE included in the paging group.

18. The UE of claim 16, wherein the one or more processors, when receiving the indication, are configured to:

receive, in a radio resource control (RRC) connected mode prior to switching to an RRC idle mode or an RRC inactive mode, an RRC release message indicating, for each of the one or more paging groups, a group identifier for the paging group and a UE identifier for each remote UE included in the paging group.

19. The UE of claim 16, wherein the one or more processors, when receiving the indication, are configured to:

receive, in a radio resource control (RRC) idle mode or an RRC inactive mode, a system information block that indicates a mapping that maps the remote UEs to the one or more paging groups based at least in part on UE identifiers of the remote UEs.

20. The UE of claim 16, wherein the one or more processors, when receiving the indication, are configured to:

receive, in a radio resource control (RRC) idle mode or an RRC inactive mode, a system information block that indicates a mapping that maps the remote UEs to the one or more paging groups based at least in part on UE types of the remote UEs.

21. The UE of claim 16, wherein the UE is included in a paging group of the one or more paging groups.

22. The UE of claim 16, wherein the remote UEs and the UE are grouped into a single paging group.

23. A base station for wireless communication, comprising:

one or more memories; and one or more processors operatively coupled to the one or more memories, the one or more memories and the one or more processors configured to:

receive, from a user equipment (UE), information identifying multiple remote UEs for which the UE serves as a relay UE;

transmit, to the UE, an indication of a grouping of the remote UEs into one or more paging groups;

transmit, to the UE in a paging occasion of one or more paging occasions, a physical downlink control channel communication including an indication that a paging group of the one or more paging groups is paged in a paging message; and transmit a physical downlink shared channel communication including the paging message and an indication of a remote UE in the paging group.

24. The base station of claim 23, wherein the one or more processors, when transmitting the indication, are configured to:

transmit, to the UE, a radio resource control (RRC) reconfiguration message indicating, for each of the one or more paging groups, a group identifier for the paging group and a UE identifier for each remote UE included in the paging group.

25. The base station of claim 24, wherein the one or more processors, when transmitting the indication, are configured to:

transmit, to the UE, a radio resource control (RRC) release message indicating, for each of the one or more paging groups, a group identifier for the paging group and a UE identifier for each remote UE included in the paging group.

26. The base station of claim 23, wherein the one or more processors, when transmitting the indication, are configured to:

transmit, to the UE, a system information block that indicates a mapping that maps the remote UEs to the one or more paging groups based at least in part on UE identifiers of the remote UEs.

27. The base station of claim 23, wherein the one or more processors, when transmitting the indication, are configured to:

transmit, to the UE, a system information block that indicates a mapping that maps the remote UEs to the one or more paging groups based at least in part on UE types of the remote UEs.

28. The base station of claim 23, wherein the one or more processors are further configured to:

transmit, to the UE in a paging occasion associated with a paging group of the one or more paging groups, a paging message for one of the remote UEs included in the paging group.

29. The base station of claim 23, wherein the UE is included in a paging group of the one or more paging groups.

30. The base station of claim 23, wherein the remote UEs and the UE are grouped into a single paging group.

\*  \*  \*  \*  \*